United States Patent
Oniwa et al.

(10) Patent No.: US 11,231,719 B2
(45) Date of Patent: Jan. 25, 2022

(54) VEHICLE CONTROL SYSTEM, VEHICLE CONTROL METHOD AND VEHICLE CONTROL PROGRAM

(71) Applicant: HONDA MOTOR CO., LTD., Tokyo (JP)

(72) Inventors: Yoshihiro Oniwa, Wako (JP); Mineyuki Yoshida, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 309 days.

(21) Appl. No.: 16/300,065

(22) PCT Filed: May 1, 2017

(86) PCT No.: PCT/JP2017/017143
§ 371 (c)(1),
(2) Date: Nov. 9, 2018

(87) PCT Pub. No.: WO2017/199750
PCT Pub. Date: Nov. 23, 2017

(65) Prior Publication Data
US 2019/0179330 A1 Jun. 13, 2019

(30) Foreign Application Priority Data
May 16, 2016 (JP) .............................. JP2016-098048

(51) Int. Cl.
*G05D 1/02* (2020.01)
*G01C 21/26* (2006.01)
(Continued)

(52) U.S. Cl.
CPC ........... *G05D 1/0223* (2013.01); *B60W 30/10* (2013.01); *B60W 30/18163* (2013.01);
(Continued)

(58) Field of Classification Search
CPC combination set(s) only.
See application file for complete search history.

(56) References Cited

U.S. PATENT DOCUMENTS

2002/0169538 A1 11/2002 Yamamura et al.
2007/0192013 A1 8/2007 Bando et al.
(Continued)

FOREIGN PATENT DOCUMENTS

JP 50-42291 4/1975
JP 09-183319 7/1997
(Continued)

OTHER PUBLICATIONS

International Search Report and Written Opinion for International Application No. PCT/JP2017/017143 dated Jul. 25, 2017, 10 pgs.

*Primary Examiner* — Christian Chace
*Assistant Examiner* — Amelia Vorce
(74) *Attorney, Agent, or Firm* — Amin, Turocy & Watson, LLP

(57) ABSTRACT

A vehicle control system includes a position recognition part that recognizes a position of a vehicle, a trajectory generating part that generates a trajectory which includes a plurality of future target positions to be reached by the vehicle, the plurality of future target positions being consecutively aligned in time series, and a travel controller that derives a target speed when the vehicle is caused to travel along the trajectory on the basis of a distance between the plurality of target positions included in the trajectory and that corrects the target speed on the basis of a first deviation between the position of the vehicle recognized by the position recognition part and a first target position corresponding to a recognition time at which the recognition of the position of the vehicle has been performed among the plurality of target positions.

9 Claims, 18 Drawing Sheets

(51) Int. Cl.
*B60W 30/10* (2006.01)
*G08G 1/00* (2006.01)
*G08G 1/16* (2006.01)
*B60W 30/18* (2012.01)
*G05D 1/00* (2006.01)
*B60W 30/12* (2020.01)
*B60W 50/00* (2006.01)

(52) U.S. Cl.
CPC ........... *G01C 21/26* (2013.01); *G05D 1/0088* (2013.01); *G05D 1/02* (2013.01); *G08G 1/00* (2013.01); *G08G 1/16* (2013.01); *G08G 1/166* (2013.01); *B60W 30/12* (2013.01); *B60W 2050/0008* (2013.01); *G05D 1/0231* (2013.01); *G05D 1/0257* (2013.01); *G05D 2201/0213* (2013.01)

(56) References Cited

U.S. PATENT DOCUMENTS

| 2008/0074246 | A1* | 3/2008 | Isaji | B60W 10/18 340/435 |
| 2008/0091318 | A1* | 4/2008 | Deng | B62D 6/003 701/41 |
| 2015/0088382 | A1* | 3/2015 | Obuchi | B60W 30/14 701/41 |
| 2016/0200321 | A1* | 7/2016 | Yamada | G05D 1/021 701/96 |
| 2017/0008521 | A1* | 1/2017 | Braunstein | G01C 21/36 |
| 2017/0349178 | A1* | 12/2017 | Suzuki | G01S 13/867 |
| 2018/0196437 | A1* | 7/2018 | Herbach | G07C 5/008 |
| 2018/0257645 | A1* | 9/2018 | Buburuzan | B60W 50/14 |
| 2018/0281814 | A1* | 10/2018 | Murray | B60W 30/0953 |
| 2018/0345963 | A1* | 12/2018 | Maura | B60W 30/12 |
| 2019/0384294 | A1* | 12/2019 | Shashua | G05D 1/0088 |

FOREIGN PATENT DOCUMENTS

| JP | 2002-331853 | 11/2002 | |
| JP | 2007-203860 | 8/2007 | |
| WO | WO-2015129425 A1 * | 9/2015 | ........... G05D 1/0221 |
| WO | WO-2016051460 A1 * | 4/2016 | ........ B60W 30/0953 |
| WO | WO-2016083518 A1 * | 6/2016 | ........... B60W 30/18 |
| WO | WO-2016114044 A1 * | 7/2016 | ............... G08G 1/16 |

* cited by examiner

VEHICLE CONTROL SYSTEM, VEHICLE CONTROL METHOD AND VEHICLE CONTROL PROGRAM

TECHNICAL FIELD

The present invention relates to a vehicle control system, a vehicle control method, and a vehicle control program.

Priority is claimed on Japanese Patent Application No. 2016-098048, filed May 16, 2016, the content of which is incorporated herein by reference.

BACKGROUND ART

In recent years, research has been performed on a technology for automatically controlling at least one of acceleration/deceleration and steering of a vehicle (hereinafter referred to as automated driving). In relation thereto, an automated traveling vehicle in which a speed difference between a host vehicle speed and a preceding vehicle speed is compared with a predetermined value which has been determined in advance, acceleration and deceleration are controlled in order to adjust an inter-vehicle distance between the host vehicle and the preceding vehicle according to the host vehicle speed or the preceding vehicle speed on the basis of a comparison result, and the acceleration and deceleration are corrected according to the host vehicle speed when the speed difference between the host vehicle speed and the preceding vehicle speed is equal to or greater than the predetermined value is known (see, for example, Patent Literature 1).

CITATION LIST

Patent Literature

Patent Literature 1
Japanese Unexamined Patent Application, First Publication No. H09-183319

SUMMARY OF INVENTION

Technical Problem

However, in the related art, there is a likelihood of acceleration and deceleration being frequently performed during automated driving. Therefore, an occupant of a vehicle is assumed to feel uncomfortable during automated driving.

An aspect of the present invention is to provide a vehicle control system, a vehicle control method, and a vehicle control program capable of reducing discomfort of an occupant.

(1) A vehicle control system according to an aspect of the present invention includes: a position recognition part that recognizes a position of a vehicle; a trajectory generating part that generates a trajectory which includes a plurality of future target positions to be reached by the vehicle, the plurality of future target positions being consecutively aligned in time series; and a travel controller that derives a target speed when the vehicle is caused to travel along the trajectory on the basis of a distance between the plurality of target positions included in the trajectory and that corrects the target speed on the basis of a first deviation between the position of the vehicle recognized by the position recognition part and a first target position corresponding to a recognition time at which the recognition of the position of the vehicle has been performed among the plurality of target positions.

(2) In the aspect (1), the travel controller may extract a second target position corresponding to a future time after a first predetermined time has elapsed from the recognition time from among the plurality of target positions, and the travel controller may derive, as the target speed, a speed obtained by dividing a length of the trajectory from the first target position to the second target position by the first predetermined time.

(3) In the aspect (2), the travel controller may further correct the target speed on the basis of a second deviation between a third target position corresponding to a future time after a second predetermined time has elapsed from the recognition time and a predicted position that the vehicle is predicted to reach at the future time, the second predetermined time being shorter than the first predetermined time.

(4) In the above aspect (3), a limit may be provided on one or both of a correction amount of the target speed based on the first deviation and a correction amount of the target speed based on the second deviation, and the travel controller may correct the derived target speed with a correction amount within a range of the limit.

(5) In the aspect (3) or (4), an area in which the correction amount of the target speed is reduced according to the respective deviations may be provided for at least one of the first deviation and the second deviation, and when an obtained deviation is within the area of at least one of the first deviation and the second deviation, the travel controller may correct the target speed with a correction amount smaller than a correction amount of the target speed when the obtained deviation is outside the area.

(6) In the aspect (5), the vehicle control system may further include an outside recognition part that recognizes other vehicles traveling around the vehicle, and the travel controller may set an area range of the area to become greater as an inter-vehicle distance between the vehicle and one or both of a preceding vehicle traveling in front of the vehicle and a subsequent vehicle traveling behind the vehicle, which are among the other vehicles recognized by the outside recognition part, increases.

(7) In the aspect (3) or (4), when, at least one of the first deviation and the second deviation is equal to or smaller than a threshold value, the travel controller may correct the derived target speed with a correction amount which is smaller than a correction amount of the target speed when the obtained deviation exceeds the threshold value.

(8) In the aspect (7), the vehicle control system may further include an outside recognition part that recognizes other vehicles traveling around the vehicle, and the travel controller may increase the threshold value as an inter-vehicle distance between the vehicle and one or both of a preceding vehicle traveling in front of the vehicle and a subsequent vehicle traveling behind the vehicle, which are among the other vehicles recognized by the outside recognition part, increases.

(9) In the aspect of any one of (3) to (8), the vehicle control system may further include a detector that detects a speed of the vehicle, and the travel controller may decrease the correction amount of the target speed based on the first deviation or the correction amount of the target speed based on the second deviation as the speed detected by the detector decreases.

(10) A vehicle control method according to an aspect of the present invention includes recognizing, by an in-vehicle computer, a position of a vehicle; generating, by the in-vehicle computer, a trajectory which includes a plurality of future target positions to be reached by the vehicle, the plurality of future target positions being consecutively aligned in time series; deriving, by the in-vehicle computer, a target speed when the vehicle is caused to travel along the trajectory on the basis of a distance between the plurality of target positions included in the trajectory; and correcting, by the in-vehicle computer, the target speed on the basis of a first deviation between the recognized position of the vehicle and a first target position corresponding to a recognition time at which the recognition of the position of the vehicle has been performed among the plurality of target positions.

(11) A vehicle control program according to an aspect of the present invention causes an in-vehicle computer to: recognize a position of a vehicle; generate a trajectory which includes a plurality of future target positions to be reached by the vehicle, the plurality of future target positions being consecutively aligned in time series; derive a target speed when the vehicle is caused to travel along the trajectory on the basis of a distance between the plurality of target positions included in the trajectory; and correct the target speed on the basis of a first deviation between the recognized position of the vehicle and a first target position corresponding to a recognition time at which the recognition of the position of the vehicle has been performed among the plurality of target positions.

Advantageous Effects of Invention

According to the above aspects (1) to (11), it is possible to reduce discomfort of an occupant.

DESCRIPTION OF EMBODIMENTS

Hereinafter, embodiments of a vehicle control system, a vehicle control method, and a vehicle control program of the present invention will be described with reference to the drawings.

[Common Configuration]

Figure 1:
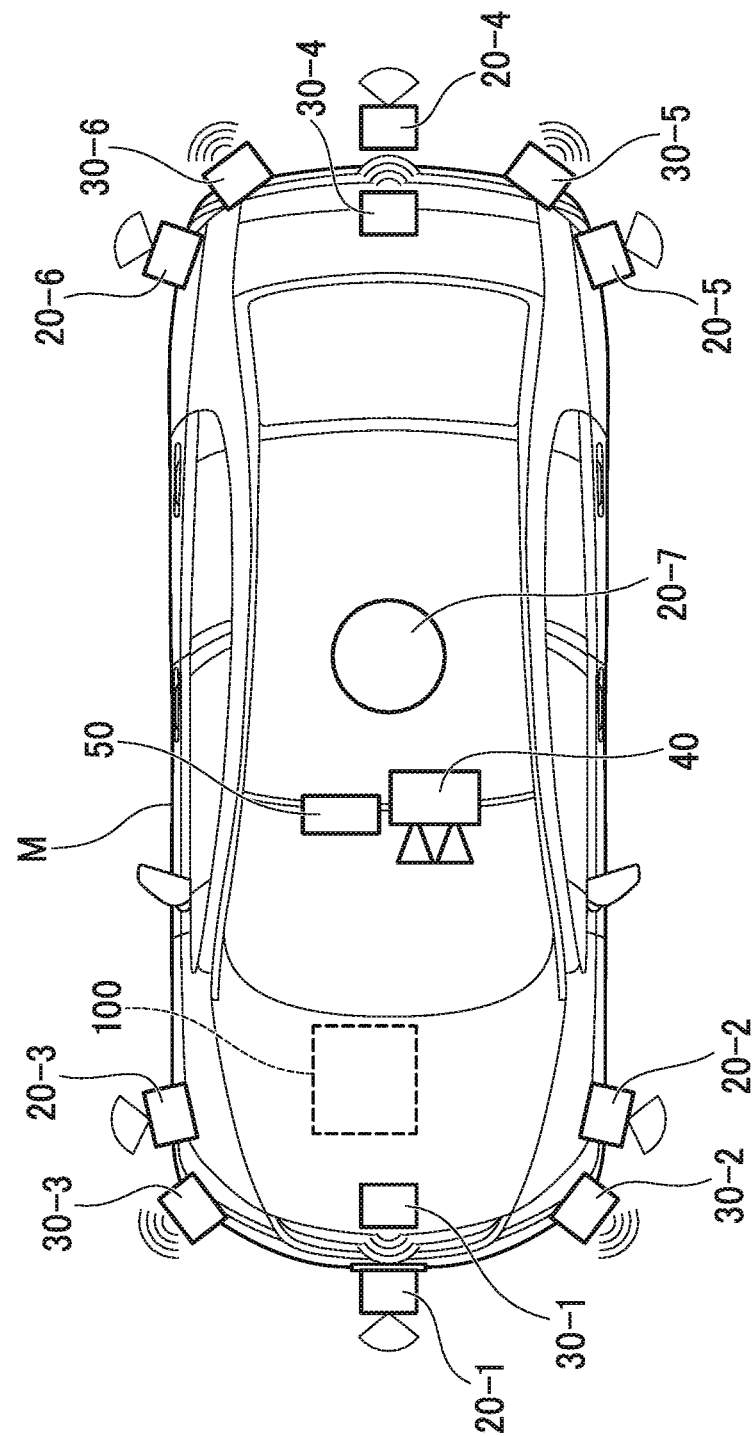
FIG. 1 is a figure illustrating components of a host vehicle in which a vehicle control system according to each embodiment is mounted.

FIG. 1 is a figure illustrating components included in a vehicle on which a vehicle control system 100 of each embodiment is mounted (hereinafter referred to as a host vehicle M). The vehicle on which the vehicle control system 100 is mounted is, for example, a two-wheeled vehicle, a three-wheeled vehicle, or a four-wheeled vehicle, and includes a vehicle using an internal combustion engine such as a diesel engine or a gasoline engine as a power source, an electric vehicle using an electric motor as a power source, a hybrid vehicle with an internal combustion engine and an electric motor, and the like. Further, the electric vehicle is driven, for example, using electric power that is discharged by a battery such as a secondary battery, a hydrogen fuel cell, a metal fuel cell, or an alcohol fuel cell.

As illustrated in FIG. 1, sensors such as finders 20-1 to 20-7, radars 30-1 to 30-6, and a camera 40, a navigation device 50 (a route guidance device), and the vehicle control system 100 are mounted on the host vehicle M.

The finders 20-1 to 20-7 are, for example, light detection and ranging or laser imaging detection and ranging (LIDAR) finders that measure scattered light with respect to irradiation light and measures a distance to a target. For example, the finder 20-1 may be attached to a front grille or the like, and the finders 20-2 and 20-3 may be attached to a side surface of a vehicle body, a door mirror, the inside of a headlight, the vicinity of side lamps, and the like. The finder 20-4 is attached to a trunk lid or the like, and the finders 20-5 and 20-6 are attached to the side surface of the vehicle body, the inside of a taillight, or the like. The finders 20-1 to 20-6 described above have, for example, a detection area of about 150° in a horizontal direction. Further, the finder 20-7 is attached to a roof or the like.

The finder 20-7 has, for example, a detection area of 360° in the horizontal direction.

The radars 30-1 and 30-4 are, for example, long-distance millimeter-wave radars of which the detection area in a depth direction is wider than those of other radars. Further, the radars 30-2, 30-3, 30-5, and 30-6 are intermediate-distance millimeter wave radars of which the detection area in the depth direction is narrower than those of the radars 30-1 and 30-4.

Hereinafter, the finders 20-1 to 20-7 are simply referred to as a "finder 20" when not particularly distinguished, and the radars 30-1 to 30-6 are simply referred to as a "radar 30" when not particularly distinguished. The radar 30 detects an object using, for example, a frequency modulated continuous wave (FM-CW) scheme.

The camera 40 is, for example, a digital camera using a solid-state imaging element such as a charge coupled device (CCD) or a complementary metal oxide semiconductor (CMOS). The camera 40 is attached to an upper portion of a front windshield, a rear surface of a rearview mirror, or the like. The camera 40 periodically and repeatedly images, for example, in front of the host vehicle M. The camera 40 may be a stereo camera including a plurality of cameras.

It should be noted that the configuration illustrated in FIG. 1 is merely an example, and a part of the configuration may be omitted or other components may be added.

First Embodiment

Figure 2:
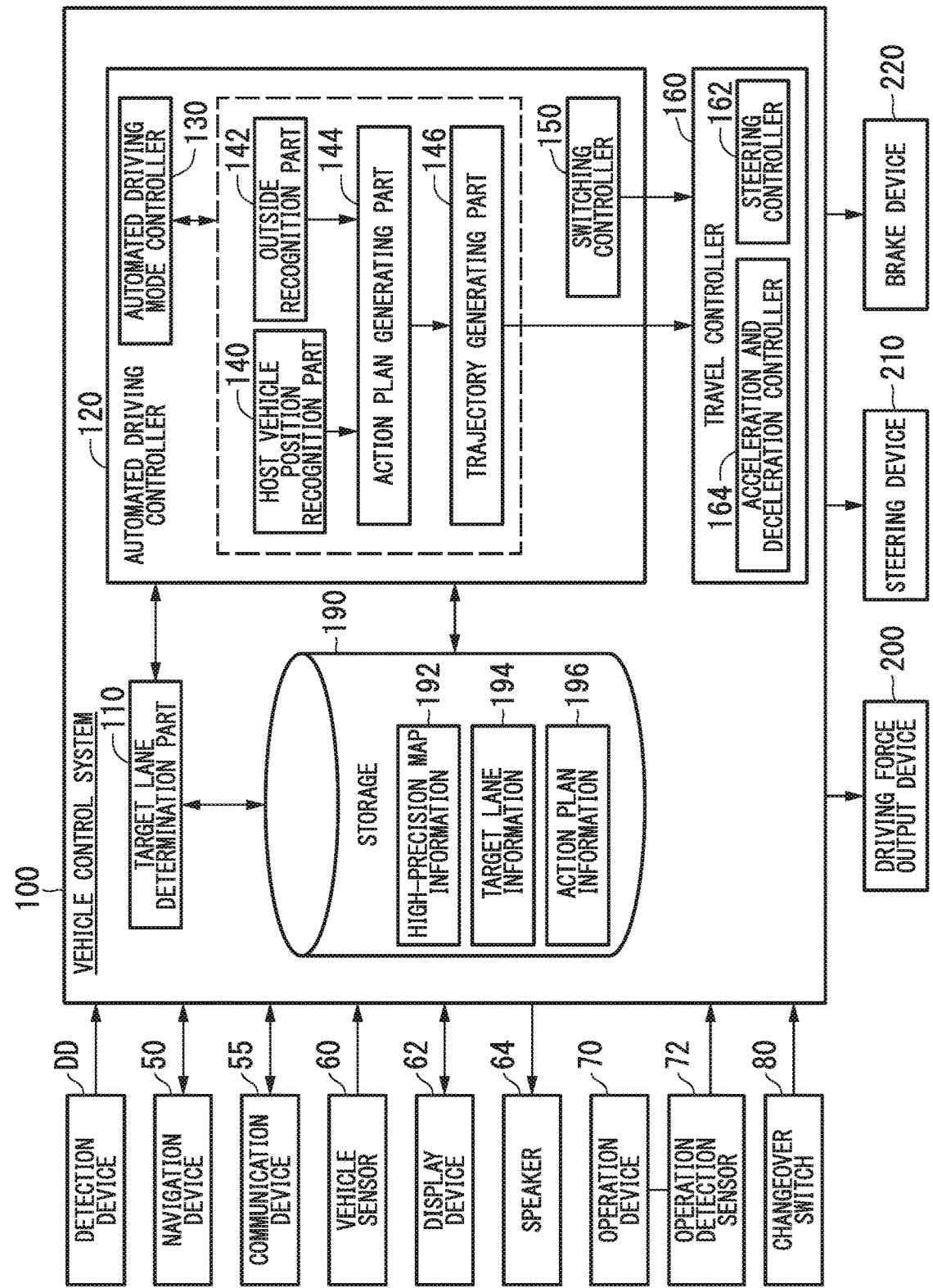
FIG. 2 is a functional configuration figure having a vehicle control system according to a first embodiment in the center.

FIG. 2 is a functional configuration figure having a vehicle control system 100 according to a first embodiment in the center.

A detection device DD including the finder 20, the radar 30, the camera 40, and the like, the navigation device 50, a communication device 55, a vehicle sensor 60, a display device 62, a speaker 64, an operation device 70, an operation detection sensor 72, a changeover switch 80, a vehicle control system 100, a driving force output device 200, a steering device 210, and a brake device 220 are mounted in the host vehicle M.

These apparatuses or devices are connected to each other by a multiplex communication line such as a controller area network (CAN) communication line, a serial communication line, a wireless communication network, or the like.

It should be noted that a vehicle control system in the claims does not refer to only the "vehicle control system 100" and may include a configuration (for example, the detection device DD) other than the vehicle control system 100.

The navigation device 50 includes a global navigation satellite system (GNSS) receiver or map information (navigation map), a touch panel type display device functioning as a user interface, a speaker, a microphone, and the like. The navigation device 50 specifies a position of the host vehicle M using the GNSS receiver and derives a route from the position to a destination designated by the user.

The route derived by the navigation device 50 is provided to the target lane determination part 110 of the vehicle control system 100. The position of the host vehicle M may be specified or supplemented by an inertial navigation system (INS) using the output of the vehicle sensor 60.

Further, when the vehicle control system 100 is executing a manual driving mode, the navigation device 50 performs guidance through sound or a navigation display for the route to the destination.

It should be noted that a configuration for specifying the position of the host vehicle M may be provided independently of the navigation device 50.

Further, the navigation device 50 may be realized, for example, by a function of a terminal device such as a smartphone or a tablet terminal possessed by the user. In this case, transmission and reception of information is performed between the terminal device and the vehicle control system 100 through wireless or wired communication.

The communication device 55 performs wireless communication using, for example, a cellular network, a Wi-Fi network, Bluetooth (registered trademark), dedicated short range communication (DSRC), or the like.

The vehicle sensors 60 include, for example, a vehicle speed sensor that detects a vehicle speed, an acceleration sensor that detects an acceleration, a yaw rate sensor that detects an angular speed around a vertical axis, and an azimuth sensor that detects a direction of the host vehicle M. The vehicle sensor 60 is an example of a "detector".

The display device 62 displays information as an image. The display device 62 may include, for example, a liquid crystal display (LCD) display device or an organic electroluminescence (EL) display device. In the embodiment, description will be given on the assumption that the display device 62 is a head-up display that reflects an image on a front window of the host vehicle M and displays the image in a field of view of the vehicle occupant. It should be noted that the display device 62 may be a display device included in the navigation device 50 or a display device of an instrument panel that displays a state (speed or the like) of the host vehicle M. The speaker 64 outputs information as sound.

The operation device 70 includes, for example, an accelerator pedal, a steering wheel, a brake pedal, a shift lever, and the like. The operation detection sensor 72 that detects the presence or absence or the amount of an operation of the driver is attached to the operation device 70.

The operation detection sensor 72 includes, for example, a degree-of-accelerator opening sensor, a steering torque sensor, a brake sensor, a shift position sensor, and the like. The operation detection sensor 72 outputs a degree of accelerator opening, a steering torque, a brake depression amount, a shift position, and the like as detection results to the travel controller 160.

It should be noted that, alternatively, the detection results of the operation detection sensor 72 may be directly output to the driving force output device 200, the steering device 210, or the brake device 220.

The changeover switch 80 is a switch that is operated by the vehicle occupant. The changeover switch 80 receives an operation of the vehicle occupant, generates a control mode designation signal for designating a control mode of the travel controller 160 as any one of an automated driving mode and a manual driving mode, and outputs the control mode designation signal to the switching controller 150.

The automated driving mode is a driving mode in which a vehicle travels in a state in which the driver does not perform an operation (or the amount of operation is smaller than that in the manual driving mode or an operation frequency is low), as described above. More specifically, the automated driving mode is a driving mode for controlling some or all of the driving force output device 200, the steering device 210, and the brake device 220 on the basis of an action plan.

Further, the changeover switch 80 may receive various operations, in addition to an operation for switching the automated driving mode. For example, when information output from the vehicle control system 100 is presented to the vehicle occupant via the display device 62, the changeover switch 80 may receive, for example, a response operation with respect to this information.

The driving force output device 200, the steering device 210, and the brake device 220 will be described before the vehicle control system 100 is described.

The driving force output device 200 outputs a travel driving force (torque) for causing the vehicle to travel to a driving wheel. For example, when the host vehicle M is a vehicle using an internal combustion engine as a power source, the driving force output device 200 includes an engine, a transmission, and an engine electronic control unit (ECU) that controls the engine. Further, when the host vehicle M is an electric car using an electric motor as a power source, the driving force output device 200 includes a traveling motor and a motor ECU that controls the traveling motor. Further, when the host vehicle M is a hybrid vehicle, the driving force output device 200 includes an engine, a transmission, an engine ECU, a traveling motor, and a motor ECU.

When the driving force output device 200 includes only an engine, the engine ECU adjusts a degree of throttle opening of engine, a gear shift stage, and the like according to information input from a travel controller 160 to be described below.

When the driving force output device 200 includes only a traveling motor, the motor ECU adjusts a duty ratio of a PWM signal to be given to the traveling motor according to the information input from the travel controller 160.

When the driving force output device 200 includes an engine and a traveling motor, the engine ECU and the motor ECU cooperate with each other to control the travel driving force according to the information input from the travel controller 160.

The steering device 210 includes, for example, a steering ECU and an electric motor.

The electric motor, for example, changes a direction of the steerable wheels by applying a force to a rack and pinion mechanism.

The steering ECU drives the electric motor according to information input from the vehicle control system 100 or input information on the steering angle or the steering torque, to change directions of the steerable wheels.

The brake device 220 is, for example, an electric servo brake device including a brake caliper, a cylinder that transfers hydraulic pressure to the brake caliper, an electric motor that generates the hydraulic pressure in the cylinder, and a brake controller.

The brake controller of the electric servo brake device controls the electric motor according to information input from the travel controller 160 so that a brake torque according to the braking operation is output to each wheel.

The electric servo brake device may include, as a backup, a mechanism for transferring the hydraulic pressure generated by the operation of the brake pedal to the cylinder via a master cylinder.

It should be noted that the brake device 220 is not limited to the electric servo brake device described above, and may be an electronically controlled hydraulic brake device. The electronically controlled hydraulic brake device controls an actuator according to the information input from the travel controller 160 and transfers the hydraulic pressure of the master cylinder to the cylinder.

In addition, the brake device 220 may include a regenerative brake using a traveling motor that may be included in the driving force output device 200. This regenerative brake uses electric power generated by the traveling motor that may be included in the driving force output device 90.

[Vehicle Control System]

Hereinafter, the vehicle control system 100 will be described. The vehicle control system 100 is realized by, for example, one or more processors or hardware having equivalent functions. The vehicle control system 100 may have a configuration in which, for example, a processor such as a central processing unit (CPU), a storage device, an electronic control unit (ECU) having a communication interface connected by an internal bus, and a micro-processing unit (MPU) are combined.

Referring back to FIG. 2, the vehicle control system 100 includes, for example, the target lane determination part 110, an automated driving controller 120, a travel controller 160, and a storage 190.

The automated driving controller 120 includes, for example, an automated driving mode controller 130, a host vehicle position recognition part 140, an outside recognition part 142, an action plan generating part 144, a trajectory generating part 146, and a switching controller 150.

The target lane determination part 110, each parts of the automated driving controller 120, and some or all of the travel controller 160 are realized by the processor executing a program (software). Further, some or all of the parts may be realized by hardware such as a large scale integration (LSI) or an application specific integrated circuit (ASIC) or may be realized in a combination of software and hardware.

Information such as high-precision map information 192, target lane information 194, and action plan information 196, for example, is stored in the storage 190.

The storage 190 is realized by a read only memory (ROM), a random access memory (RAM), a hard disk drive (HDD), a flash memory, or the like. The program to be executed by the processor may be stored in the storage 190 in advance or may be downloaded from an external device via an in-vehicle Internet facility or the like.

Further, the program may be installed in the storage 190 by a portable storage medium having the program stored therein being mounted on a drive device (not illustrated).

Further, the vehicle control system 100 may be distributed by a plurality of computer devices.

The target lane determination part 110 is realized by, for example, an MPU. The target lane determination part 110 divides the route provided from the navigation device 50 into a plurality of blocks (for example, divides a route every 100 [m] in a vehicle traveling direction), and determines the target lane for each block by referring to the high-precision map information 192. The target lane determination part 110, for example, determines the lane from the left in which the host vehicle is traveling. The target lane determination part 110 determines, for example, the target lane so that the host vehicle M can travel on a reasonable traveling route for traveling to a branch destination when a branch place or a merging place exists in the route. The target lane determined by the target lane determination part 110 is stored in the storage 190 as the target lane information 194.

The high-precision map information 192 is map information with higher precision than that of the navigation map included in the navigation device 50. The high-precision map information 192 includes, for example, information on a center of a lane or information on boundaries of a lane.

Further, the high-precision map information 192 may include road information, traffic regulations information, address information (address and postal code), facilities information, telephone number information, and the like.

The road information includes information indicating types of road such as expressways, toll roads, national highways, and prefectural roads, or information such as the number of lanes on a road, a width of each lane, a gradient of the road, a position of the road (three-dimensional coordinates including a longitude, a latitude, and a height), a curvature of a curve of the lane, a position of merging or branching points of a lane, and signs provided on a road.

The traffic regulations information includes information such as lane closures due to roadwork, traffic accidents, traffic congestion, or the like.

The automated driving mode controller 130 determines an automated driving mode to be executed by the automated driving controller 120. The automated driving mode in the first embodiment includes the following modes. It should be noted that the following is merely an example, and the number of automated driving modes or the content of the mode may be arbitrarily determined.

[Mode A]

Mode A is a mode in which a degree of automated driving is highest. When mode A is performed, all vehicle controls such as complicated merging control are automatically performed, and therefore, the vehicle occupant does not have to monitor the surroundings or a state of the host vehicle M.

[Mode B]

Mode B is a mode in which the degree of automated driving is next highest after mode A. When mode B is performed, all the vehicle controls are automatically performed in principle, but the driving operation of the host vehicle M may be entrusted to the vehicle occupant according to situations. Therefore, it is necessary for the vehicle occupant to monitor the surroundings or state of the host vehicle M.

[Mode C]

Mode C is a mode in which the degree of automated driving is next highest after mode B. When mode C is performed, the vehicle occupant needs to perform a confirmation operation with respect to the changeover switch 80 according to situations. In mode C, for example, the vehicle occupant is notified of a timing of a lane change, and when the vehicle occupant performs an operation with respect to the changeover switch 80 for instructing lane change, automatic lane change is performed. Therefore, it is necessary for the vehicle occupant to monitor the surroundings or state of the host vehicle M.

The automated driving mode controller 130 determines the automated driving mode on the basis of an operation of the vehicle occupant with respect to the changeover switch 80, an event determined by the action plan generating part 144, a travel aspect determined by the trajectory generating part 146, and the like.

In the automated driving mode, a limit may be set according to the performance or the like of the detection device DD of the host vehicle M. For example, when the performance of the detection device DD is low, mode A may not be performed. In any of the modes, it is possible to switch the driving mode to the manual driving mode (overriding) according to an operation with respect to the changeover switch 80.

The host vehicle position recognition part 140 of the automated driving controller 120 recognizes a lane (travel lane) in which the host vehicle M is traveling, and a relative position of the host vehicle M with respect to the travel lane on the basis of the high-precision map information 192 stored in the storage 190, and information input from the finders 20, the radars 30, the camera 40, the navigation device 50, or the vehicle sensor 60.

The host vehicle position recognition part 140 compares, for example, a pattern of a road division line (for example, an arrangement of a solid line and a broken line) recognized from the high-precision map information 192 with a pattern of a road division line around the host vehicle M recognized from an image captured by the camera 40 in order to recognize the travel lane.

In this recognition, the position of the host vehicle M acquired from the navigation device 50 or a processing result by an INS may be added.

Figure 3:
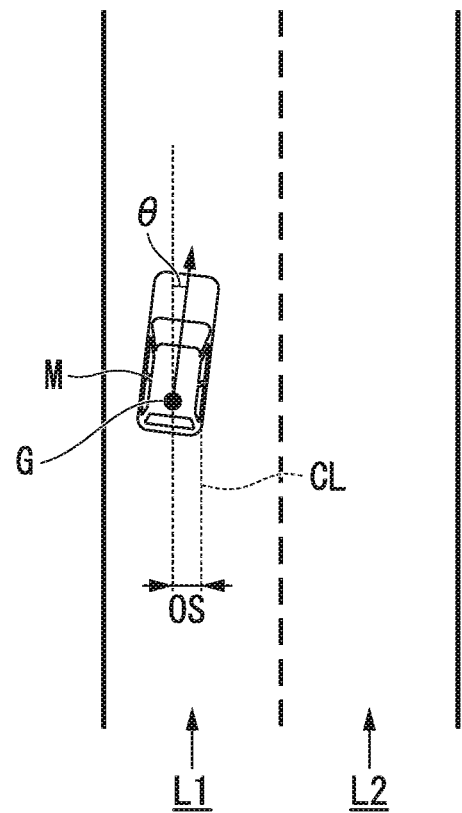
FIG. 3 is a figure illustrating a state in which a relative position of the host vehicle with respect to a travel lane is recognized by a host vehicle position recognition part.

FIG. 3 is a figure illustrating a state in which the relative position of the host vehicle M with respect to the travel lane L1 is recognized by the host vehicle position recognition part 140. The host vehicle position recognition part 140, for example, may recognize a deviation OS of a reference point G (for example, a centroid) of the host vehicle M from a travel lane center CL, and an angle θ with respect to a connecting line along the travel lane center CL in the travel direction of the host vehicle M, as the relative position of the host vehicle M with respect to the travel lane L1.

It should be noted that, instead of this, the host vehicle position recognition part 140 may recognize, for example, the position of the reference point of the host vehicle M with respect to one of side end portions of the host vehicle lane L1 as the relative position of the host vehicle M with respect to the travel lane. The relative position of the host vehicle M recognized by the host vehicle position recognition part 140 is provided to the target lane determination part 110.

The outside recognition part 142 recognizes a state such as a position, a speed, and an acceleration of a nearby vehicle on the basis of information input from the finder 20, the radar 30, the camera 40, and the like.

The nearby vehicle is, for example, a vehicle that is traveling around the host vehicle M and is a vehicle that travels in the same direction as that of the host vehicle M. The position of the nearby vehicle may be represented by a representative point such as a centroid or a corner of another vehicle or may be represented by an area represented by an outline of another vehicle.

The "state" of the nearby vehicle may include an acceleration of the nearby vehicle and an indication of whether or not the nearby vehicle is changing lane (or whether or not the nearby vehicle is about to change lane), which are recognized on the basis of the information of the various devices.

Further, the outside recognition part 142 may also recognize a position of a guardrail, a utility pole, a parked vehicle, a pedestrian, and other objects, in addition to nearby vehicles.

The action plan generating part 144 sets a starting point of automated driving and/or a destination for automated driving. The starting point of automated driving may be a current position of the host vehicle M or may be a point at which an operation for instructing automated driving is performed. The action plan generating part 144 generates the action plan in a section between the starting point and the destination for automated driving. It should be noted that the present invention is not limited thereto, and the action plan generating part 144 may generate the action plan for any section.

The action plan includes, for example, a plurality of events to be executed sequentially.

Examples of the events include a deceleration event for decelerating the host vehicle M, an acceleration event for accelerating the host vehicle M, a lane keeping event for causing the host vehicle M to travel so that the host vehicle M does not deviate from a travel lane, a lane change event for changing the travel lane, an overtaking event for causing the host vehicle M to overtake a preceding vehicle, a branching event for changing a lane to a desired lane at a branch point or causing the host vehicle M to travel so that the host vehicle M does not deviate from a current travel lane, a merging event for accelerating and decelerating the host vehicle M at a merging lane for merging into a main lane and changing the travel lane, and a handover event in which the driving mode is shifted from the manual driving mode to the automated driving mode at a start point of automated driving or the driving mode is shifted from the automated driving mode to the manual driving mode at a scheduled end point of automated driving.

The action plan generating part 144 sets a lane change event, a branch event, or a merging event at a place at which the target lane determined by the target lane determination part 110 is switched.

Information indicating the action plan generated by the action plan generating part 144 is stored in the storage 190 as action plan information 196.

Figure 4:
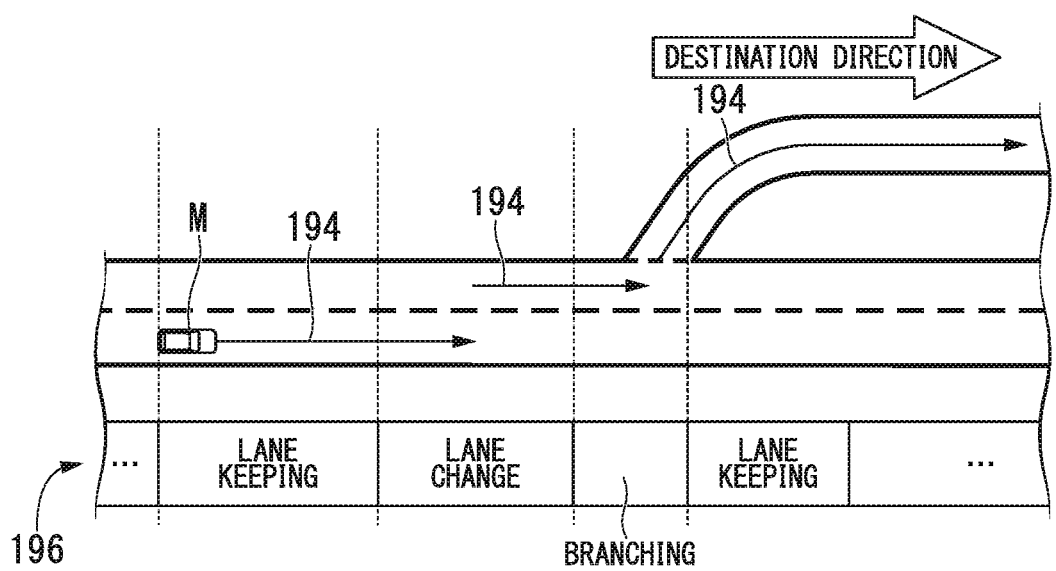
FIG. 4 is a figure illustrating an example of an action plan generated for a certain section.

FIG. 4 is a figure illustrating an example of an action plan generated for a certain section. As illustrated in FIG. 4, the action plan generating part 144 generates an action plan necessary for the host vehicle M to travel on the target lane indicated by the target lane information 194. It should be noted that the action plan generating part 144 may dynamically change the action plan according to a change in a situation of the host vehicle M irrespective of the target lane information 194.

For example, in a case a speed of the nearby vehicle recognized by the outside recognition part 142 exceeds a threshold value during vehicle traveling or a moving direction of the nearby vehicle traveling in the lane adjacent to the host vehicle lane is directed toward the host vehicle lane, the action plan generating part 144 changes events that have been set in driving sections in which the host vehicle M is scheduled to travel.

For example, in a case in which an event is set so that a lane change event is executed after a lane keeping event, when it has been found from a result of the recognition of the outside recognition part 142 that a vehicle has traveled at a speed equal to or higher than a threshold value from behind in a lane that is a lane change destination during the lane keeping event, the action plan generating part 144 changes an event subsequent to the lane keeping event from a lane change event to a deceleration event, a lane keeping event, or the like. As a result, even when a change occurs in a state of the outside, the vehicle control system 100 can cause the host vehicle M to safely automatically travel.

Figure 5:
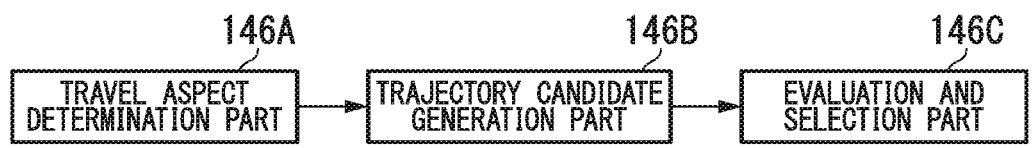
FIG. 5 is a figure illustrating an example of a configuration of a trajectory generating part.

FIG. 5 is a figure illustrating an example of a configuration of the trajectory generating part 146. The trajectory generating part 146 includes, for example, a travel aspect determination part 146A, a trajectory candidate generation part 146B, and an evaluation and selection part 146C.

For example, when a lane keeping event is performed, the travel aspect determination part 146A determines a travel aspect of any one of constant speed traveling, following traveling, low-speed following traveling, decelerating traveling, curved traveling, obstacle avoidance traveling, and the like.

In this case, when there are no other vehicles in front of the host vehicle M, the travel aspect determination part 146A determines the travel aspect to be the constant speed traveling.

Further, when the vehicle is to perform following traveling with respect to the preceding vehicle, the travel aspect determination part 146A determines the travel aspect to be the following traveling.

Further, the travel aspect determination part 146A determines the travel aspect to be the low-speed follow traveling in a congested situation or the like.

Further, when the outside recognition part 142 recognizes deceleration of the preceding vehicle or when an event such as stopping or parking is performed, the travel aspect determination part 146A determines the travel aspect to be the decelerating traveling.

Further, when the outside recognition part 142 recognizes that the host vehicle M has reached a curved road, the travel aspect determination part 146A determines the travel aspect to be the curved traveling.

Further, when an obstacle is recognized in front of the host vehicle M by the outside recognition part 142, the travel aspect determination part 146A determines the travel aspect to be the obstacle avoidance traveling.

Further, when a lane change event, an overtaking event, a branch event, a merging event, a handover event, or the like is performed, the travel aspect determination part 146A determines the travel aspect according to each event.

Figure 6:
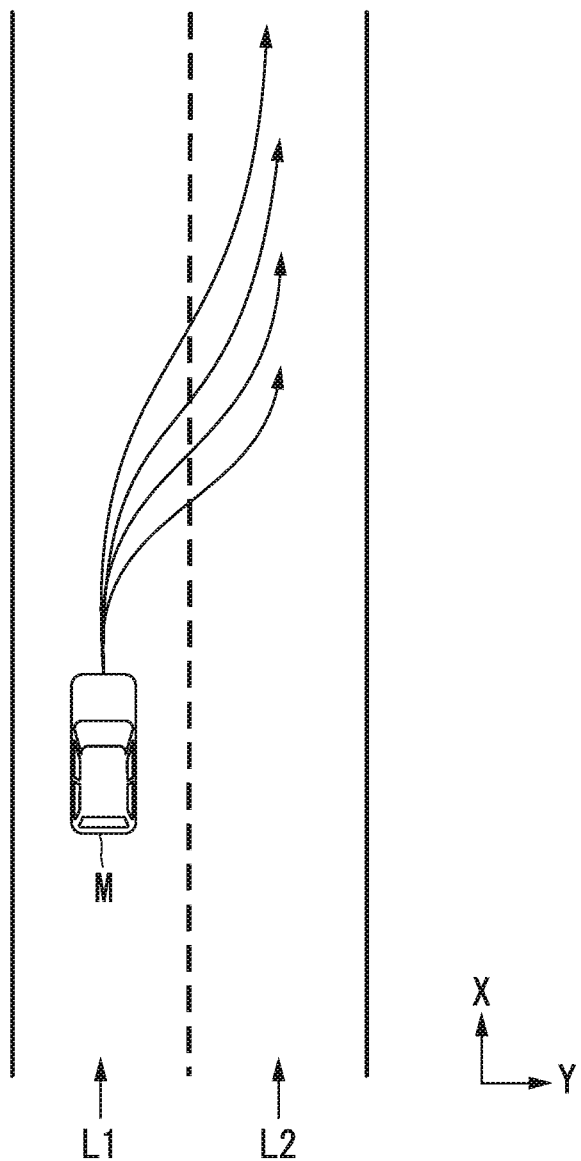
FIG. 6 is a figure illustrating an example of a trajectory candidate generated by a trajectory candidate generation part.

The trajectory candidate generation part 146B generates candidates for the trajectory on the basis of the travel aspect determined by the travel aspect determination part 146A. FIG. 6 is a figure illustrating an example of candidates for the trajectory generated by the trajectory candidate generation part 146B. FIG. 6 illustrates candidates for the trajectory generated when the host vehicle M changes the lane from the lane L1 to the lane L2.

The trajectory candidate generation part 146B determines the trajectory as illustrated in FIG. 6, for example, to be a collection of the target positions (the trajectory points K) that the reference position G (for example, a centroid or a rear wheel shaft center) of the host vehicle M should reach at every predetermined future time. In the embodiment, an example in which an interval between predetermined future times is one second will be described.

Figure 7:
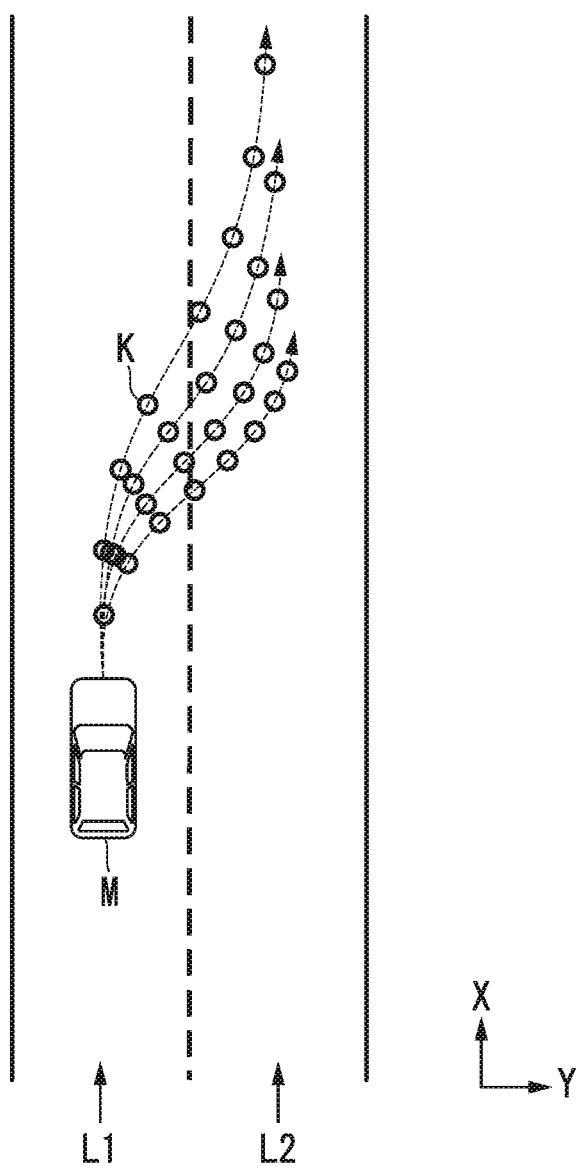
FIG. 7 is a figure in which candidates for a trajectory generated by the trajectory candidate generation part are represented by trajectory points.

FIG. 7 is a figure in which the candidate for the trajectory generated by the trajectory candidate generation part 146B is represented by the trajectory points K. When an interval between the trajectory points K is wider, the speed of the host vehicle M becomes higher, and when the interval between the trajectory points K is narrower, the speed of the host vehicle M becomes lower. Therefore, the trajectory candidate generation part 146B gradually widens the interval between the trajectory points K when acceleration is desired, and gradually narrows the interval between the trajectory points K when deceleration is desired.

Thus, since the trajectory point K includes a speed component, the trajectory candidate generation part 146B needs to give a target speed to each trajectory point K. The target speed may be determined according to the travel aspect determined by the travel aspect determination part 146A.

A scheme of determining the target speed when lane change (including branching) is performed will be described herein.

Figure 8:
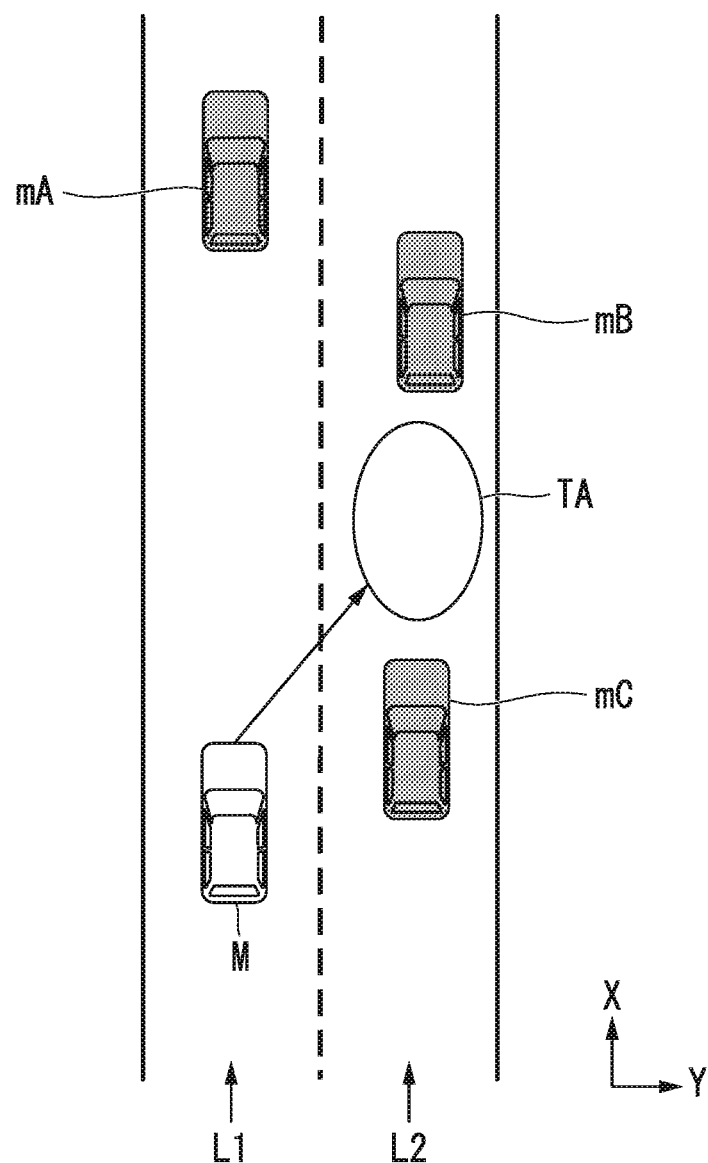
FIG. 8 is a figure illustrating a lane change target position.

The trajectory candidate generation part 146B first sets a lane changing target position (or a merging target position). The lane changing target position is set as a relative position with respect to the nearby vehicle and is used for a determination as to "whether the lane change is performed between the host vehicle and a certain nearby vehicle". The trajectory candidate generation part 146B determines the target speed when the lane change is performed while focusing on three nearby vehicles with reference to the lane changing target position. FIG. 8 is a figure illustrating the lane changing target position TA.

In FIG. 8, L1 indicates the host vehicle traveling lane, and L2 indicates an adjacent lane. Here, a nearby vehicle traveling immediately in front of the host vehicle M on the same lane as that of the host vehicle M is referred to as a preceding vehicle mA, a nearby vehicle traveling immediately in front of the lane changing target position TA is referred to as a front reference vehicle mB, and a nearby vehicle traveling immediately behind the lane changing target position TA is referred to as a rear reference vehicle mC.

The host vehicle M needs to perform acceleration or deceleration in order to move to the side of the lane changing target position TA, but should avoid catching up with the preceding vehicle mA in this case. Therefore, the trajectory candidate generation part 146B predicts a future state of the three nearby vehicles and determines a target speed so that the host vehicle M does not interfere or contact with each nearby vehicle.

Figure 9:
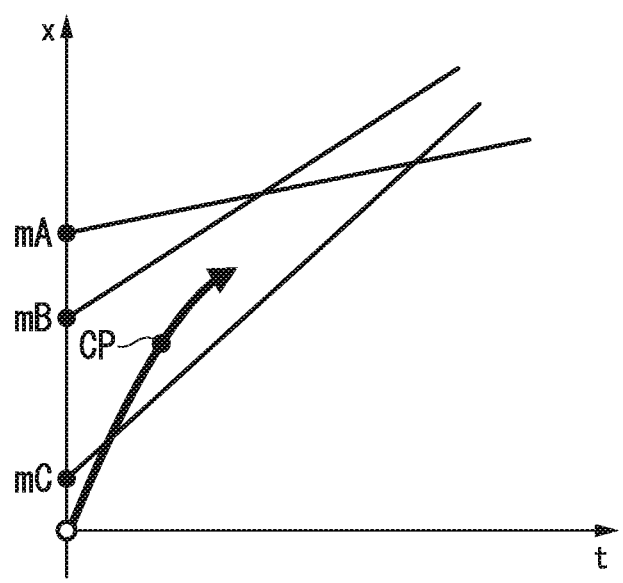
FIG. 9 is a figure illustrating a speed generation model in a case the speeds of three nearby vehicles are assumed to be constant.

FIG. 9 is a figure illustrating a speed generation model when speeds of three nearby vehicles are assumed to be constant. In FIG. 9, straight lines extending from points mA, mB, and mC indicate displacements in a traveling direction when each nearby vehicle is assumed to perform constant speed traveling. The host vehicle M should be between the front reference vehicle mB and the rear reference vehicle mC at a point CP at which the lane change is completed and should be behind the preceding vehicle mA before that. Under such limitation, the trajectory candidate generation part 146B derives a plurality of time-series patterns of the target speed until the lane change is completed. The trajectory candidate generation part 146B derives a plurality of trajectory candidates as illustrated in FIG. 7 by applying the time-series patterns of the target speed to a model such as a spline curve.

It should be noted that a motion pattern of the three nearby vehicles is not limited to the constant speed as illustrated in FIG. 9, but the prediction may be performed on the premise of constant acceleration and constant jerk.

The evaluation and selection part 146C performs evaluation on the trajectory candidates generated by the trajectory candidate generation part 146B, for example, from two viewpoints including planning and safety, and selects a trajectory to be output to the travel controller 160. From the viewpoint of the planning, for example, when follow-up of an already generated plan (for example, the action plan) is high and a total length of the trajectory is short, the trajectory obtains a high evaluation. For example, when lane change to the right is desired, a trajectory in which the lane change to the left is performed and then returning is performed obtains a low evaluation. From the viewpoint of the safety, for example, as a distance between the host vehicle M and an object (a nearby vehicle or the like) is longer at each trajectory point and the change amount in acceleration/deceleration or steering angle is smaller, a high evaluation is obtained.

The switching controller 150 switches the driving mode between the automated driving mode and the manual driving mode on the basis of the signal input from the changeover switch 80. Further, the switching controller 150 switches the driving mode from the automated driving mode to the manual driving mode on the basis of an operation with respect to the operation device 70 for instructing acceleration/deceleration or steering. For example, the switching controller 150 switches the driving mode from the automated driving mode to the manual driving mode when a state in which the amount of operation indicated by the signal input from the operation device 70 exceeds a threshold value continues for a reference time or more (overriding). Further, the switching controller 150 may cause the driving mode to return to the automated driving mode when no operation with respect to the operation device 70 is detected for a predetermined time after switching to the manual driving mode according to overriding.

The travel controller 160 includes a steering controller 162 and an acceleration and deceleration controller 164. The travel controller 160 controls the driving force output device 200, the steering device 210, and the brake device 220 so that the host vehicle M passes through the trajectory generated by the trajectory generating part 146 at the scheduled time.

Figure 10:
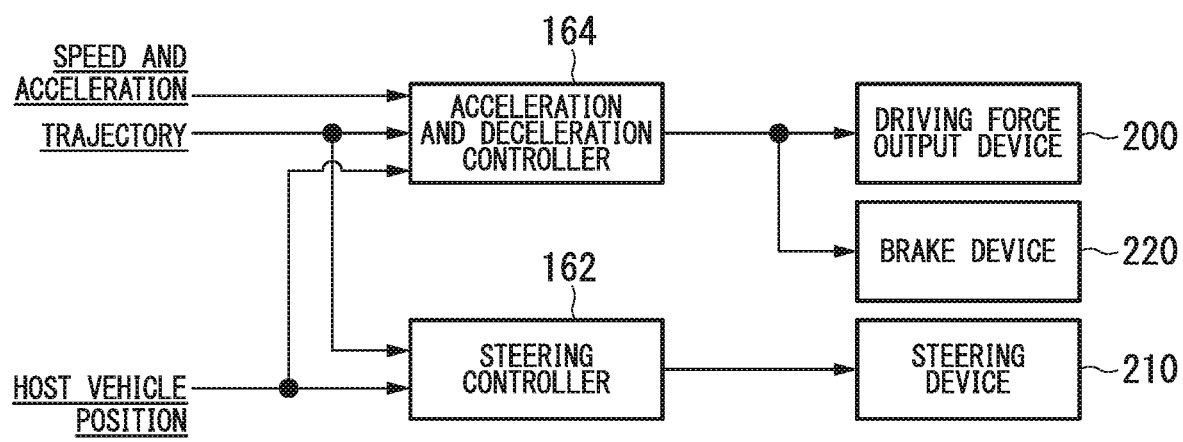
FIG. 10 is a figure illustrating a relationship between a steering controller/an acceleration and deceleration controller and control targets thereof.

FIG. 10 is a figure illustrating a relationship between the steering controller 162 and the acceleration and deceleration controller 164, and control targets thereof.

The steering controller 162 controls the steering device 210 on the basis of the trajectory generated by the trajectory generating part 146 and the position of the host vehicle M (a host vehicle position) recognized by the host vehicle position recognition part 140. For example, the steering controller 162 determines a steering angle on the basis of information such as a turning angle $\phi i$ corresponding to the trajectory point K(i) included in the trajectory generated by the trajectory generating part 146, a vehicle speed (or an acceleration or a jerk) acquired from the vehicle sensor 60, or an angular speed (a yaw rate) around a vertical axis, and determines the amount of control of the electric motor in the steering device 210 so that a displacement corresponding to the steering angle is given to vehicle wheels.

The acceleration and deceleration controller 164 controls the driving force output device 200 and the brake device 220 on the basis of the speed v and the acceleration $\alpha$ of the host vehicle M detected by the vehicle sensor 60 and the trajectory generated by the trajectory generating part 146.

[Acceleration and Deceleration Control]

Figure 11:
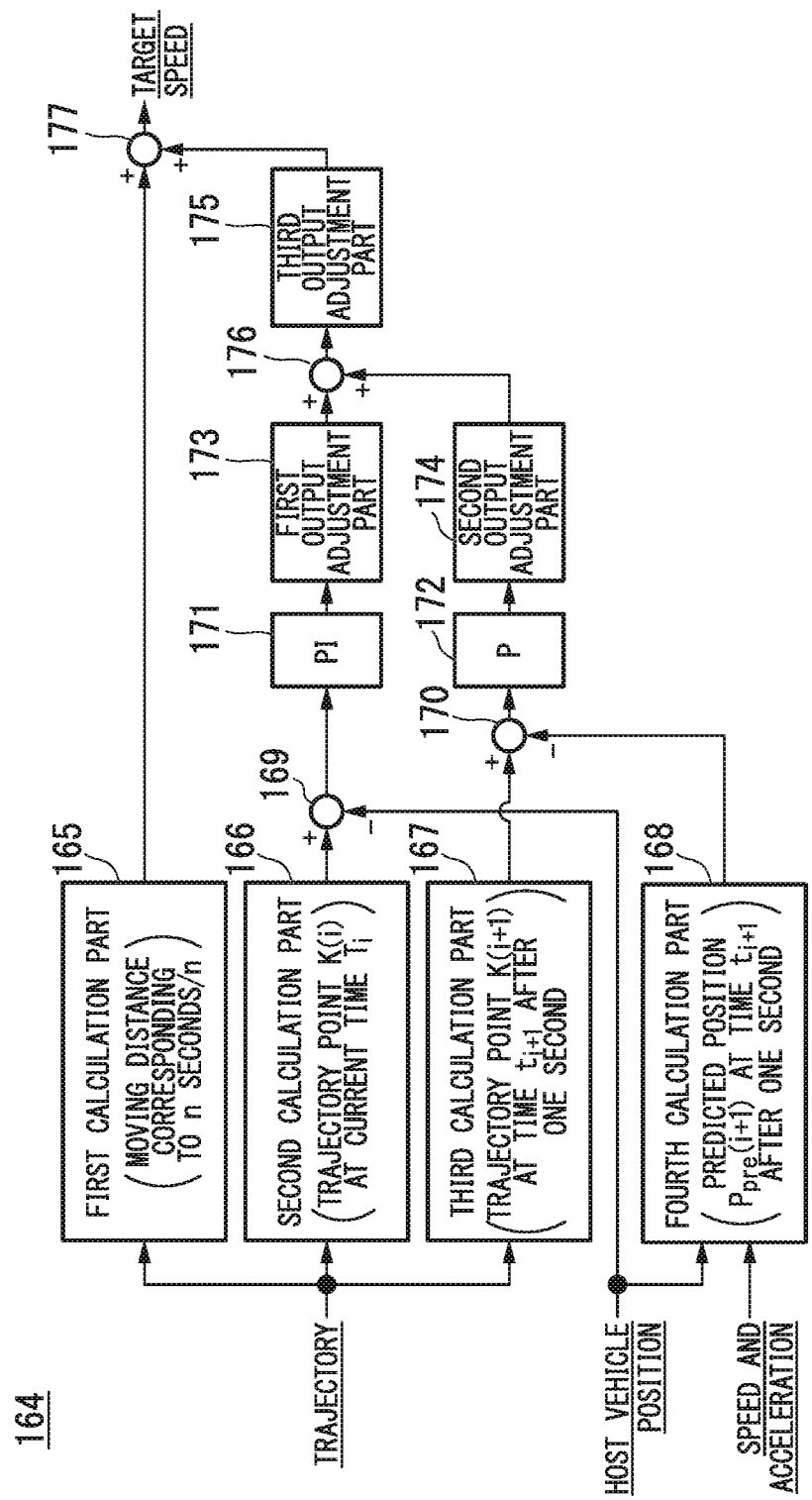
FIG. 11 is a figure illustrating an example of a configuration of an acceleration and deceleration controller in the first embodiment.

FIG. 11 is a figure illustrating an example of a configuration of the acceleration and deceleration controller 164 in the first embodiment.

The acceleration and deceleration controller 164 includes, for example, a first calculation part 165, a second calculation part 166, a third calculation part 167, a fourth calculation part 168, subtractors 169 and 170, a proportional integral controller 171, a proportional controller 172, a first output adjustment part 173, a second output adjustment part 174, a third output adjustment part 175, and adders 176 and 177.

It should be noted that some or all of these configurations may be included in the trajectory generating part 146 (particularly, the trajectory candidate generation part 146B).

Figure 12:
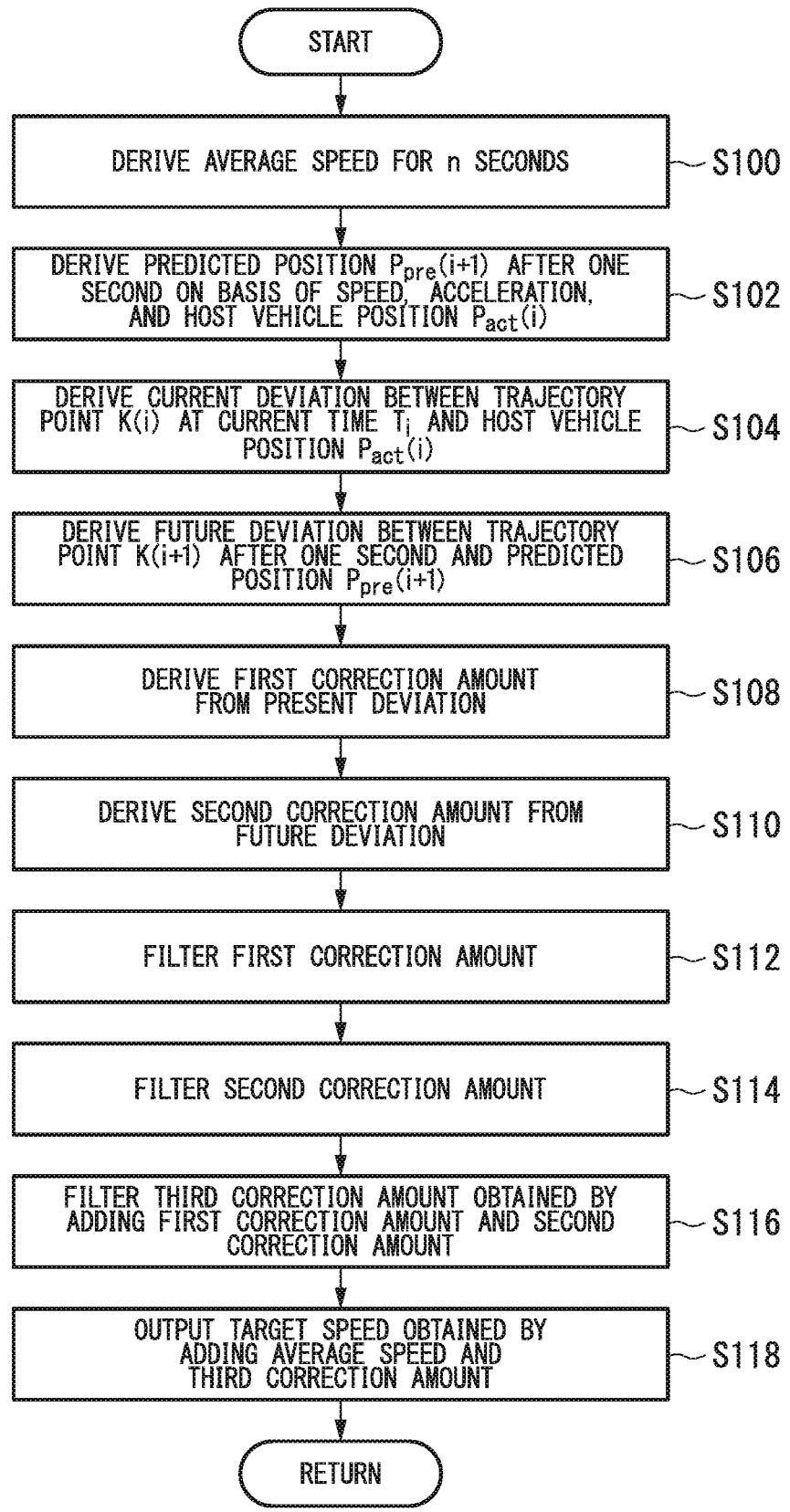
FIG. 12 is a flowchart showing an example of a flow of a process of the acceleration and deceleration controller in the first embodiment.

Hereinafter, processing content of each configuration in the acceleration and deceleration controller 164 illustrated in FIG. 11 will be described with reference to a flowchart. FIG. 12 is a flowchart showing an example of a flow of a process of the acceleration and deceleration controller 164 in the first embodiment. In the following description, in case of various positions, a position on the traveling direction side of the host vehicle M with reference to the position of the host vehicle M at a certain point in time (for example, a current time $t_j$) is treated as a positive value, and a position on the side opposite to the traveling direction is treated as a negative value.

First, the first calculation part 165 derives a target speed when the host vehicle M is caused to travel along the trajectory generated by the trajectory generating part 146 on the basis of a distance between a plurality of trajectory points K included in the trajectory. For example, the first calculation part 165 extracts trajectory points K(i) to K(i+n) which the host vehicle M should reach until a time of n seconds elapses from a current time $t_i$ from among the plurality of trajectory points K included in the trajectory, and derives an average speed by dividing a length of the trajectory including these trajectory points K(i) to K(i+n) by the time of n seconds (step S100). This average speed is treated as the target speed of the host vehicle M on the trajectory including the trajectory points K(i) to K(i+n). The time for n seconds is an example of a "first predetermined time".

The second calculation part 166 extracts the trajectory point K(i) corresponding to the current time $t_i$ from among the plurality of trajectory points K included in the trajectory generated by the trajectory generating part 146.

The third calculation part 167 extracts the trajectory point K(i+1) corresponding to a time after a predetermined time (for example, one second) shorter than the time of n seconds has elapsed from the current time $t_i$. The predetermined time shorter than the time of n seconds from the current time $t_i$ is an example of a "second predetermined time".

On the basis of a vehicle position $P_{act}(i)$ recognized by the host vehicle position recognition part 140 and a speed v and an acceleration α of the host vehicle M detected by the vehicle sensor 60, the fourth calculation part 168 derives a predicted position $P_{pre}(i+1)$ that the host vehicle M is predicted to reach at the time after one second has elapsed from the current time $t_i$ (step S102). For example, the fourth calculation part 168 derives the predicted position $P_{pre}(i+1)$ on the basis of Equation (1) below. In the equation, t is a difference time between the time $t_i$ and the time $t_{i+1}$. That is, tin the equation corresponds to a time interval (a sampling time) between the trajectory points K.

[Math. 1]

$$P_{pre}(i+1) = \frac{\alpha}{2}t^2 + vt + P_{act}(i) \quad (1)$$

The subtractor 169 derives a deviation obtained by subtracting the host vehicle position $P_{act}(i)$ from the trajectory point K(i) extracted by the second calculation part 166 (hereinafter referred to as a current deviation) (step S104). The subtractor 169 outputs the derived current deviation to the proportional integral controller 171.

The current deviation is an example of a "first deviation".

The subtractor 170 derives a deviation (hereinafter referred to as a future deviation) obtained by subtracting the predicted position $P_{pre}(i+1)$ derived by the fourth calculation part 168 from the trajectory point K(i+1) extracted by the third calculation part 167 (Step S106). The subtractor 170 outputs the derived future deviation to the proportional controller 172. The future deviation is an example of a "second deviation".

The proportional integral controller 171 multiplies the current deviation output by the subtractor 169 by a predetermined proportional gain and also multiplies a time integral value of the current deviation by a predetermined integral gain. The proportional integral controller 171 adds the current deviation multiplied by the proportional gain and the time integral value of the current deviation multiplied by the integral gain to derive, as the amount of operation, the amount of correction of the speed (hereinafter referred to as a first correction amount) so that the host vehicle M approaches the trajectory point K(i) from the host vehicle position $P_{act}(i)$ (step S108). By inserting an integral term in this way, it is possible to correct the target speed so that the current deviation approaches zero. As a result, the acceleration and deceleration controller 164 can cause the host vehicle position $P_{act}(i)$ at the current time $t_i$ to further approach the trajectory point K(i) which is the target position corresponding to the current time $t_i$.

The proportional controller 172 multiplies the future deviation output by the subtractor 170 by a predetermined proportional gain to derive, as the amount of operation, the amount of correction of the speed (hereinafter referred to as a second correction amount) so that the host vehicle M approaches the trajectory point K(i+1) from the predicted position $P_{pre}(i+1)$ at a time point after one second (step S110). Thus, the proportional controller 172 performs proportional control in which the future deviation including uncertain elements is allowed.

The first output adjustment part 173 is, for example, a filter circuit that imposes a limitation on the first correction amount derived by the proportional integral controller 171. For example, the first output adjustment part 173 performs filtering on the first correction amount so that the speed indicated by the first correction amount is not increased or decreased by 15 km/h or more (step S112).

The second output adjustment part 174 is, for example, a filter circuit that imposes a limitation on the second correction amount derived by the proportional controller 172. For example, the second output adjustment part 174 performs filtering on the second correction amount so that the speed indicated by the second correction amount is not increased or decreased by 15 km/h or more, similar to the first output adjustment part 173 (step S114).

It should be noted that a limit at the time of an increase in speed and a limit at the time of a decrease may be different from each other in one or both of a speed limit of filtering by the first output adjustment part 173 and a speed limit of filtering by the second output adjustment part 174.

The adder 176 adds the first correction amount adjusted by the first output adjustment part 173 and the second correction amount adjusted by the second output adjustment part 174, and outputs a third correction amount obtained by adding the first and second amounts of correction to the third output adjustment part 175.

The third output adjustment part 175 is, for example, a filter circuit that imposes a limit on the third correction amount output by the adder 176. For example, the third output adjustment part 175 performs filtering on the third correction amount such that the speed indicated by the third correction amount is not increased or decreased by 5 km/h or more (step S116).

The adder 177 adds the third correction amount adjusted by the third output adjustment part 175 to the average speed derived by the first calculation part 165 to output a resultant value as a target speed of the host vehicle M for n seconds from the current time $t_i$ (step S118). Accordingly, the acceleration and deceleration controller 164 determines the amounts of control of the driving force output device 200 and the brake device 220 according to the target speed.

Through such control, it is possible to suppress frequent occurrence of acceleration and deceleration. For example, when the target speed is not corrected using the current deviation between the host vehicle position $P_{act}(i)$ recognized by the host vehicle position recognition part 140 and the trajectory point K(i) corresponding to a time (a recognition time, such as the current time $t_i$) at which the position recognition of the host vehicle M has been performed among the plurality of trajectory points K(i+1), the target speed is corrected with only the second correction amount, that is, the amount of correction of the speed so that the host vehicle M approaches the trajectory point K(i+1) from the predicted position $P_{pre}$(i+1) at a point in time after one second. In this case, there is a likelihood of occurrence of a steady offset (a deviation) so that the vehicle always overtakes each trajectory point K or the vehicle does not always catch up with each trajectory point K due to a sensor error or the like. In addition, since the target speed is corrected with only the future deviation including uncertain elements, frequent acceleration and deceleration may occur.

On the other hand, in the embodiment, since the target speed is corrected by both the first correction amount and the second correction amount using the current deviation, it is possible to reduce an offset with respect to the trajectory point K. More specifically, since the proportional integral controller 171 performs the time integration of the current deviation to derive the first correction amount, the host vehicle position $P_{act}$(i) at the current time $t_i$ can further approach the trajectory point K(i) which is the target position corresponding to the current time $t_i$. Further, by the proportional controller 172 performing the proportional control, it is possible to allow the future deviation including uncertain elements to some extent. As a result, it is possible to suppress frequent occurrence of acceleration and deceleration.

According to the first embodiment described above, it is possible to suppress the frequent occurrence of the acceleration and deceleration by including the host vehicle position recognition part 140 that recognizes the position of the host vehicle M, the trajectory generating part 146 that generates the trajectory which includes a plurality of trajectory points K indicating future target positions to be reached by the host vehicle M, the plurality of future target positions being consecutively aligned in time series, and the acceleration and deceleration controller 164 of the travel controller 160 that derives the target speed when the host vehicle M is caused to travel along the trajectory on the basis of the distance between the plurality of trajectory points K included in the trajectory and that corrects the target speed on the basis of the current deviation (the first deviation) between the position of the host vehicle M recognized by the host vehicle position recognition part 140 and the trajectory point K(the first target position) corresponding to a time (a recognition time) at which the recognition of the position of the host vehicle M has been performed among the plurality of target positions K. As a result, it is possible to reduce discomfort of the occupant.

Second Embodiment

Hereinafter, a second embodiment will be described. The second embodiment is different from the first embodiment in that a dead zone DZ is set for any one or both of the future deviation and the current deviation in order to suppress frequent acceleration and deceleration. The dead zone DZ is an area provided for a decrease in the amount of correction according to each deviation. Hereinafter, such a difference will be mainly described.

Figure 13:
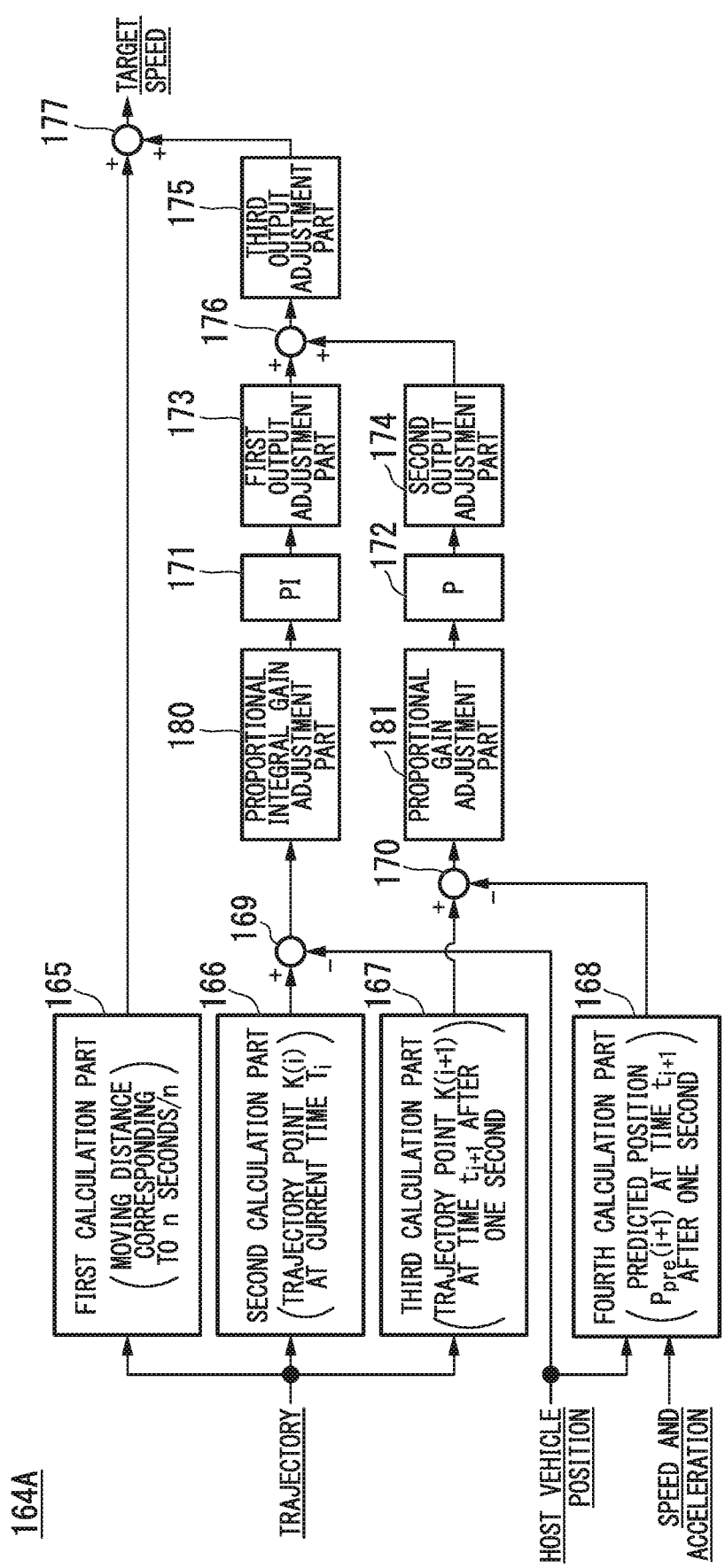
FIG. 13 is a figure illustrating an example of a configuration of an acceleration and deceleration controller in a second embodiment.

FIG. 13 is a figure illustrating an example of a configuration of an acceleration and deceleration controller 164A in the second embodiment. The acceleration and deceleration controller 164A further includes, for example, a proportional integral gain adjustment part 180 and a proportional gain adjustment part 181, in addition to the configuration of the acceleration and deceleration controller 164 in the first embodiment described above.

The proportional integral gain adjustment part 180 sets the first dead zone DZ1 for the current deviation. When the current deviation derived by the subtractor 169 is within the first dead zone DZ1, the proportional integral gain adjustment part 180 decreases one or both of the proportional gain and the integral gain in the proportional integral controller 171 as compared with a case in which the current deviation is not within the first dead zone DZ1. "Decrease in gain" means that a gain with a positive value approaches zero or a negative value or that a gain with a negative value approaches zero or a positive value.

Figure 14:
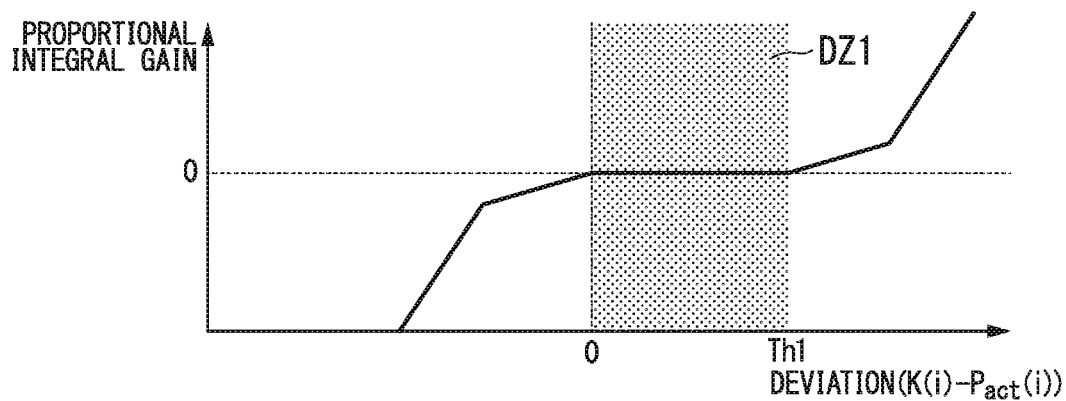
FIG. 14 is a figure illustrating an example of a first dead zone with respect to a current deviation.
Figure 15:
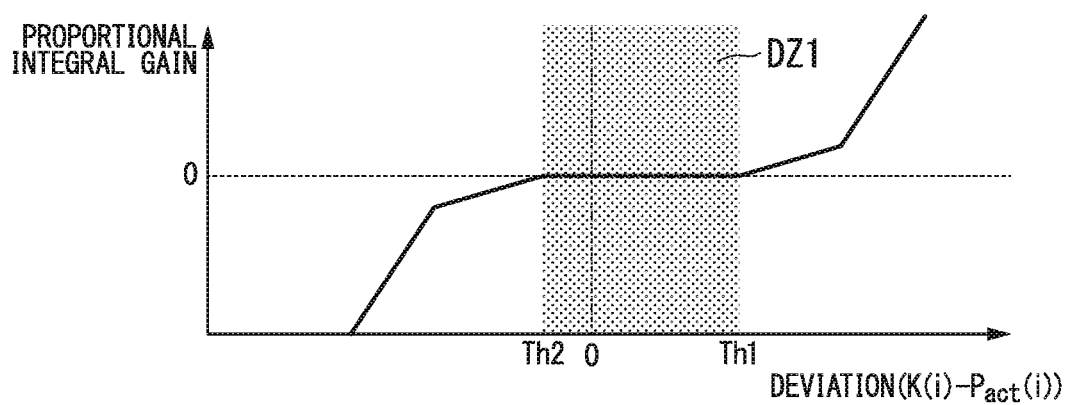
FIG. 15 is a figure illustrating another example of the first dead zone with respect to the current deviation.

FIGS. 14 and 15 are figures illustrating examples of the first dead zone DZ1 with respect to the current deviation.

As in the examples illustrated in FIGS. 14 and 15, the first dead zone DZ1 may be set only on the positive side of the current deviation (the side on which the trajectory point K(i) is in front of the host vehicle position $P_{act}$(i)) or may be set to be biased to the positive side.

"Biased to the positive side" means, for example, that a centroid or the like of the area of the first dead zone DZ1 is present on the positive side of the current deviation.

In the example of FIG. 14, an area in which the current deviation ranges from zero to a threshold value Th1 (a positive value) is set as the first dead zone DZ1.

Further, in the example of FIG. 15, an area from the threshold value Th2 (a negative value) to a threshold value Th1 (a positive value) is set as the first dead zone DZ1.

As illustrated in FIGS. 14 and 15, the proportional gain or the integral gain is zero in the first dead zone DZ1. Therefore, when the current deviation is in the first dead zone DZ1, the first correction amount derived by the proportional integral controller 171 becomes zero or substantially zero.

The proportional gain adjustment part 181 sets the second dead zone DZ2 for the future deviation. When the future deviation derived by the subtractor 170 is within the second dead zone DZ2, the proportional gain adjustment part 181 decreases the proportional gain in the proportional controller 172 as compared with a case in which the future deviation is not within the second dead zone DZ2.

Figure 16:
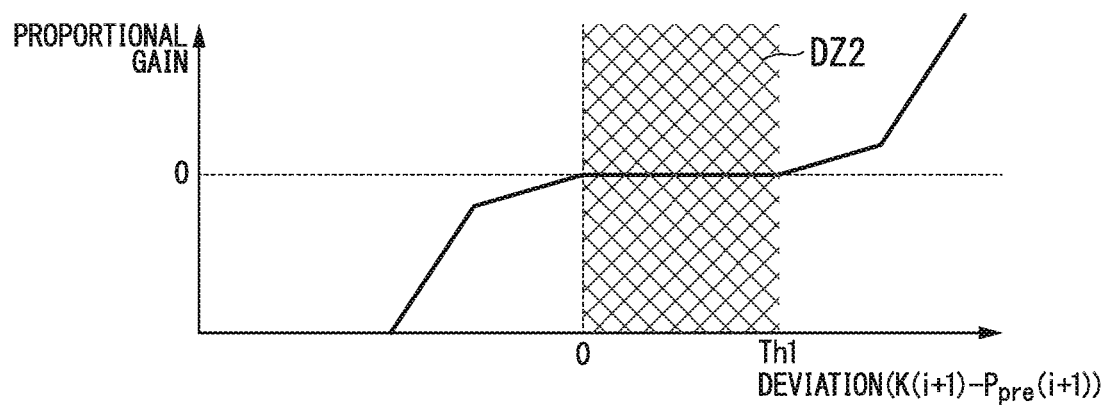
FIG. 16 is a figure illustrating an example of a second dead zone with respect to a future deviation.
Figure 17:
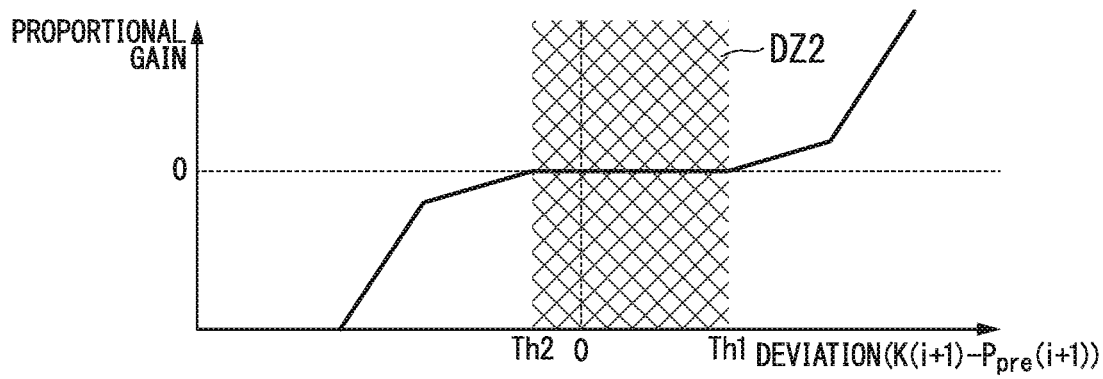
FIG. 17 is a figure illustrating another example of a second dead zone with respect to the future deviation.

FIGS. 16 and 17 are figures illustrating other examples of the second dead zone DZ2 with respect to the future deviation.

As in the examples illustrated in FIGS. 16 and 17, the second dead zone DZ2 may be set only on the positive side of the future deviation or may be set to be biased to the positive side, similar to the first dead zone DZ1.

In the example of FIG. 16, an area in which the future deviation ranges from zero to a threshold value Th1 (a positive value) is set as the second dead zone DZ2.

Further, in the example of FIG. 17, an area from the threshold value Th2 (a negative value) to a threshold value Th1 (a positive value) is set as the second dead zone DZ2.

As illustrated in FIGS. 16 and 17, the proportional gain is zero in the second dead zone DZ2. Therefore, when the future deviation is within the second dead zone DZ2, the second correction amount derived by the proportional controller 172 becomes zero or substantially zero.

It should be noted that the first dead zone DZ1 and the second dead zone DZ2 described above may be different in size of the area from each other. Any one of both may be set only on the positive side of the deviation, and the other may be set to be biased to the positive side.

Figure 18:
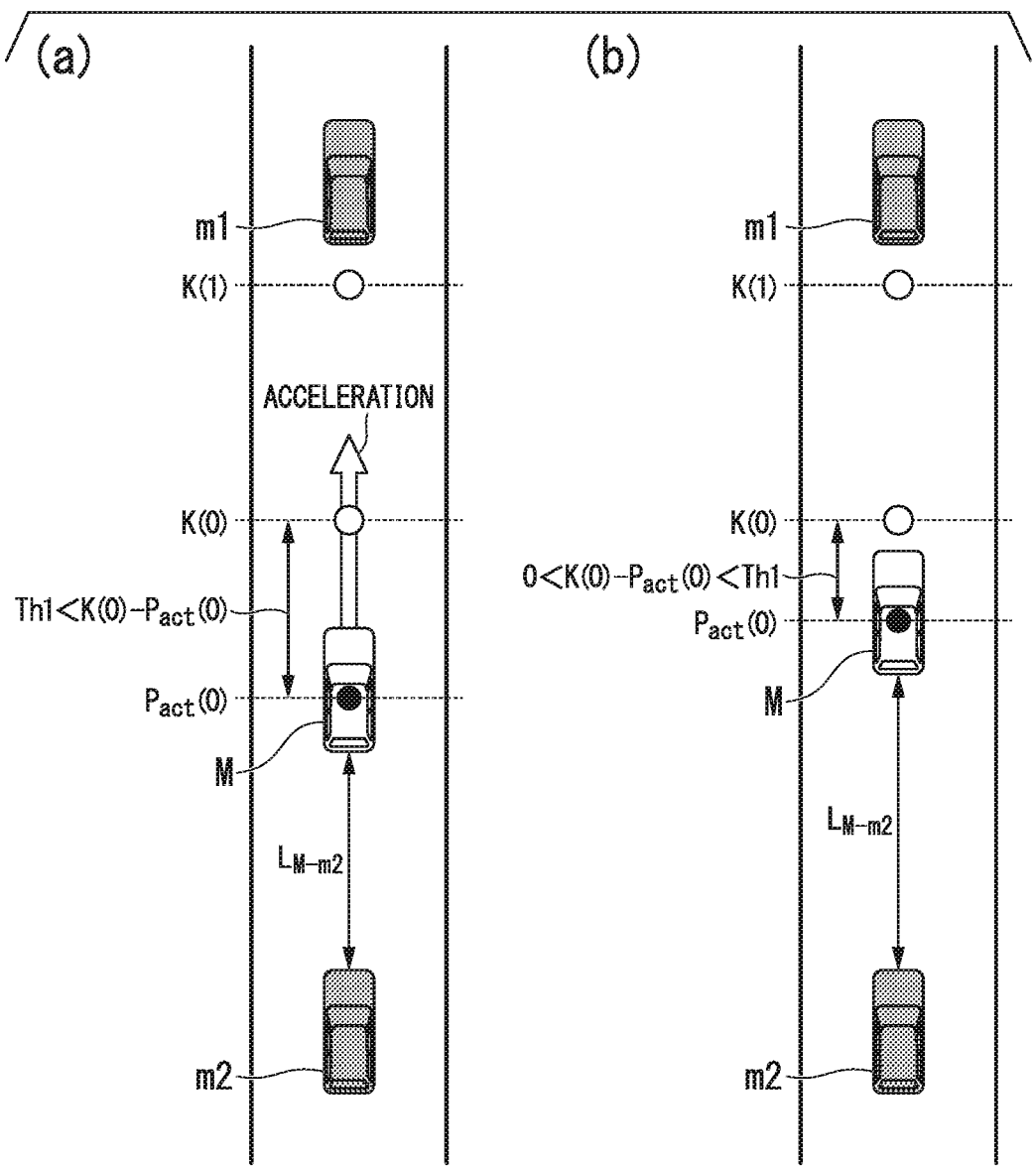
FIG. 18 is a figure illustrating an example of acceleration and deceleration control in each situation.

FIG. 18 is a figure illustrating an example of acceleration and deceleration control for each situation. Part (a) of FIG.

18 shows one situation in which the current deviation is not within the first dead zone DZ1. Further, part (b) of FIG. 18 shows one situation in which the current deviation is within the first dead zone DZ1.

In any of the situations, a trajectory point K(0) is located in front of the host vehicle position $P_{act}(0)$ at a current time $t_0$. That is, the host vehicle M has not reached the trajectory point K(0) to be reached at the current time $t_0$.

Therefore, the acceleration and deceleration controller 164 needs to control the driving force output device 200 to accelerate the host vehicle M.

For example, in the situation illustrated in part (a) of FIG. 18, since the current deviation is outside the first dead zone DZ1, the first correction amount is added to the average speed, and the host vehicle M is accelerated from the current average speed.

On the other hand, in the situation illustrated in part (b) of FIG. 18, since the current deviation is within the first dead zone DZ1, the first correction amount is decreased. In this case, it becomes easy for the average speed derived by the first calculation part 165 to be maintained without the acceleration control being performed. Through such a process, it is possible to suppress frequent acceleration when the host vehicle M has not reached the trajectory point K(0).

Further, in the above-described example, the example in which the dead zone DZ is set for the deviation when the trajectory point K(i) is in front of the host vehicle position $P_{act}(i)$, but the present invention is not limited thereto. When the trajectory point K(i) is behind the host vehicle position $P_{act}(i)$, the dead zone DZ may be set for the deviation.

Figure 19:
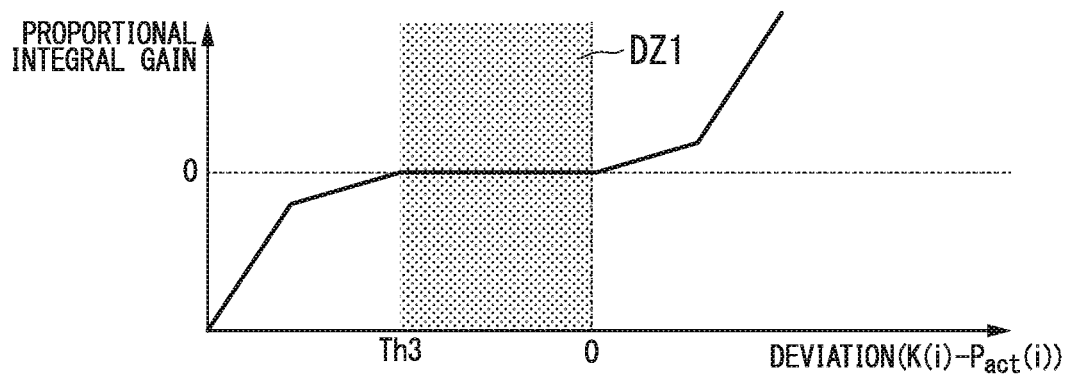
FIG. 19 is a figure illustrating still another example of a first dead zone with respect to the current deviation.
Figure 20:
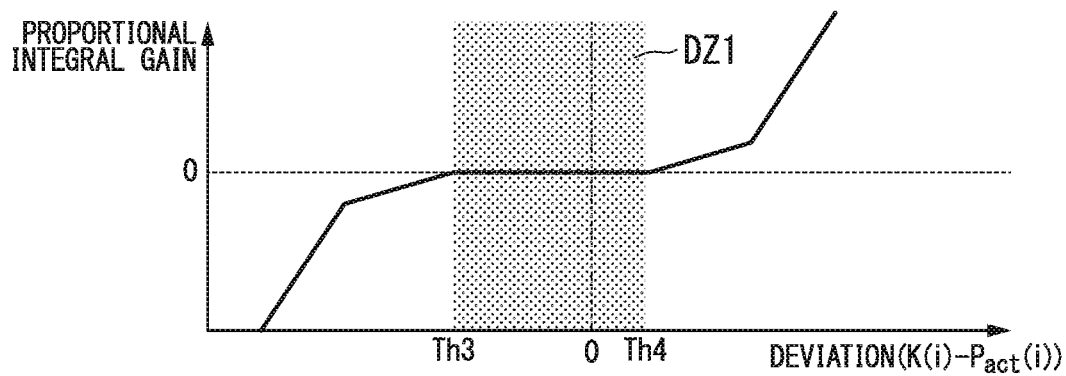
FIG. 20 is a figure illustrating still another example of the first dead zone with respect to the current deviation.

FIGS. 19 and 20 are figures illustrating other examples of the first dead zone DZ1 with respect to the current deviation.

As in the examples illustrated in FIGS. 19 and 20, the first dead zone DZ1 may be set only on the negative side of the current deviation (the side on which the trajectory point K(i) is behind the host vehicle position $P_{act}(i)$) or may be set to be biased to the negative side.

In the example of FIG. 19, an area in which the current deviation ranges from a threshold value Th3 (a negative value) to zero is set as the first dead zone DZ1.

Further, in the example of FIG. 20, an area from the threshold value Th3 (a negative value) to a threshold value Th4 (a positive value) is set as the first dead zone DZ1.

Figure 21:
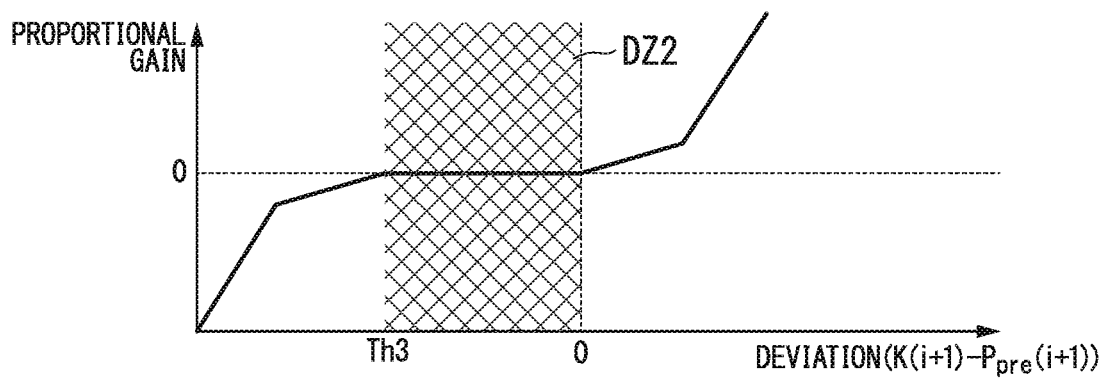
FIG. 21 is a figure illustrating still another example of the second dead zone with respect to the future deviation.
Figure 22:
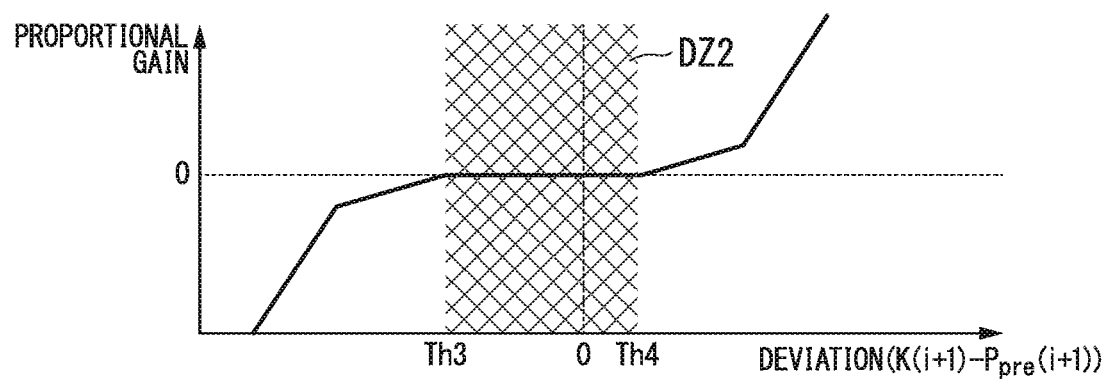
FIG. 22 is a figure illustrating still another example of the second dead zone with respect to the future deviation.

FIGS. 21 and 22 are figures illustrating other examples of the second dead zone DZ2 with respect to the future deviation.

As in the example illustrated in FIGS. 21 and 22, the second dead zone DZ2 may be set only on the negative side of the future deviation or may be set to be biased to the negative side.

In the example of FIG. 21, an area in which the future deviation ranges from a threshold value Th3 (a negative value) to zero is set as the second dead zone DZ2.

Further, in the example of FIG. 22, an area from the threshold value Th3 (a negative value) to a threshold value Th4 (a positive value) is set as the second dead zone DZ2.

In the above example, the first dead zone DZ1 and the second dead zone DZ2 may be different in size of the area from each other. Any one of both may be set only on the negative side of the deviation and the other may be set to be biased to the negative side.

Figure 23:
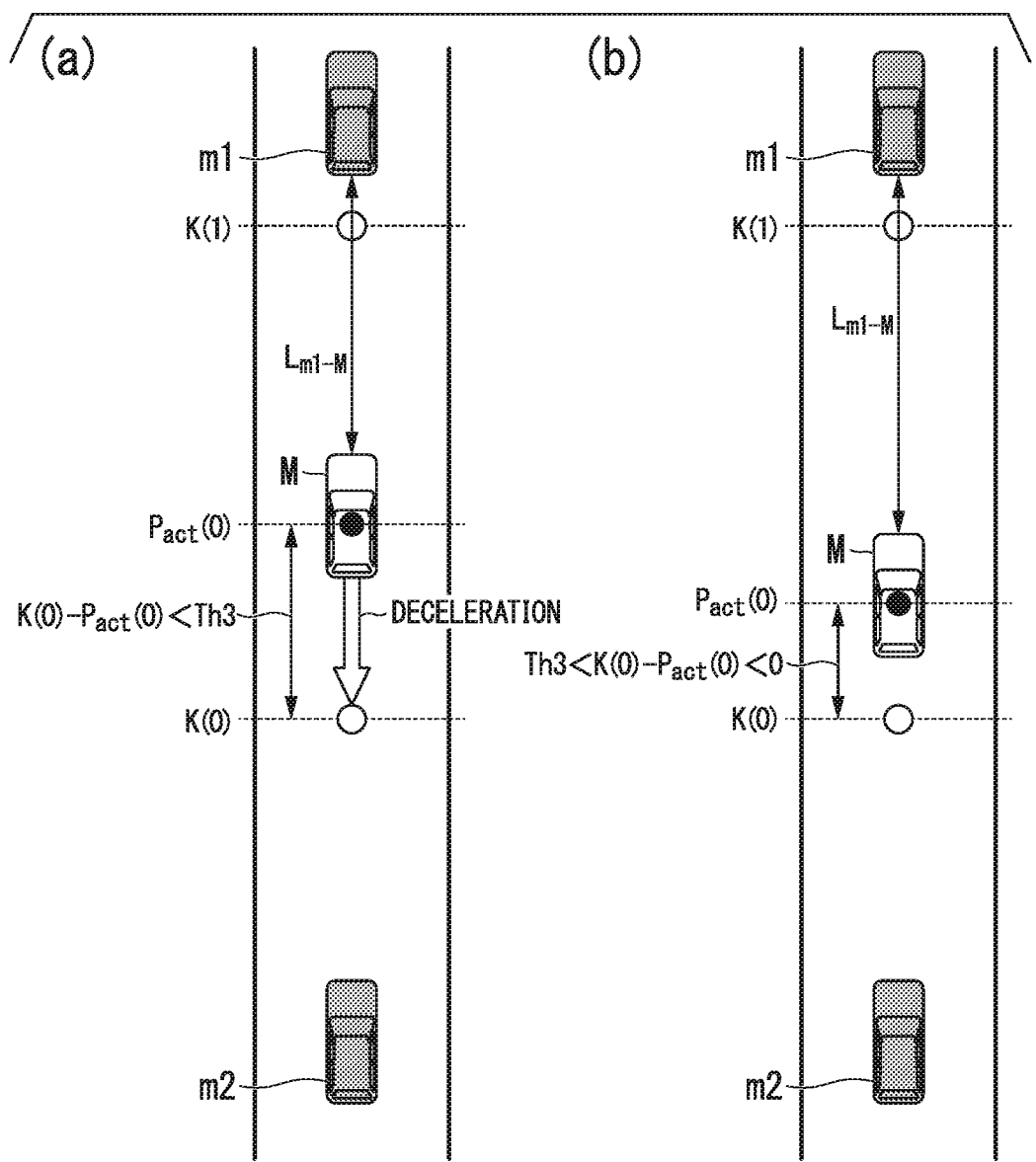
FIG. 23 is a figure illustrating an example of acceleration and deceleration control in each situation.

FIG. 23 is a figure illustrating an example of acceleration and deceleration control for each situation. Part (a) of FIG. 23 shows one situation in which the current deviation is not within the first dead zone DZ1. Further, part (b) of FIG. 23 shows one situation in which the current deviation is within the first dead zone DZ1.

In any of the situations, a trajectory point K(0) is located behind the host vehicle position $P_{act}(0)$ at the current time $t_0$. That is, the host vehicle M exceeds the trajectory point K(0) to be reached at the current time $t_0$. Therefore, the acceleration and deceleration controller 164 needs to control the driving force output device 200 to decelerate the host vehicle M.

For example, in the situation illustrated in part (a) of FIG. 23, since the current deviation is outside the first dead zone DZ1, the first correction amount is added to the average speed, and the host vehicle M is decelerated from the current average speed.

On the other hand, in the situation illustrated in part (b) of FIG. 23, since the current deviation is within the first dead zone DZ1, the first correction amount is decreased. In this case, it becomes easy for the average speed derived by the first calculation part 165 to be maintained without the deceleration control being performed. Through such a process, it is possible to suppress frequent deceleration when the host vehicle M has exceeded the trajectory point K(0).

[Process of Changing Area of Dead Zone]

The proportional integral gain adjustment part 180 may change an area size of the first dead zone DZ1 to be set for the current deviation on the basis of an inter-vehicle distance between the host vehicle M and one or both of the preceding vehicle traveling immediately in front of the host vehicle M and the subsequent vehicle traveling immediately behind the host vehicle M among the nearby vehicles of which states are recognized by the outside recognition part 142.

Further, the proportional gain adjustment part 181 may change an area size of the second dead zone DZ2 to be set for the future deviation on the basis of an inter-vehicle distance between the host vehicle M and one or both of the preceding vehicle traveling immediately in front of the host vehicle M and the subsequent vehicle traveling immediately behind the host vehicle M.

Figure 24:
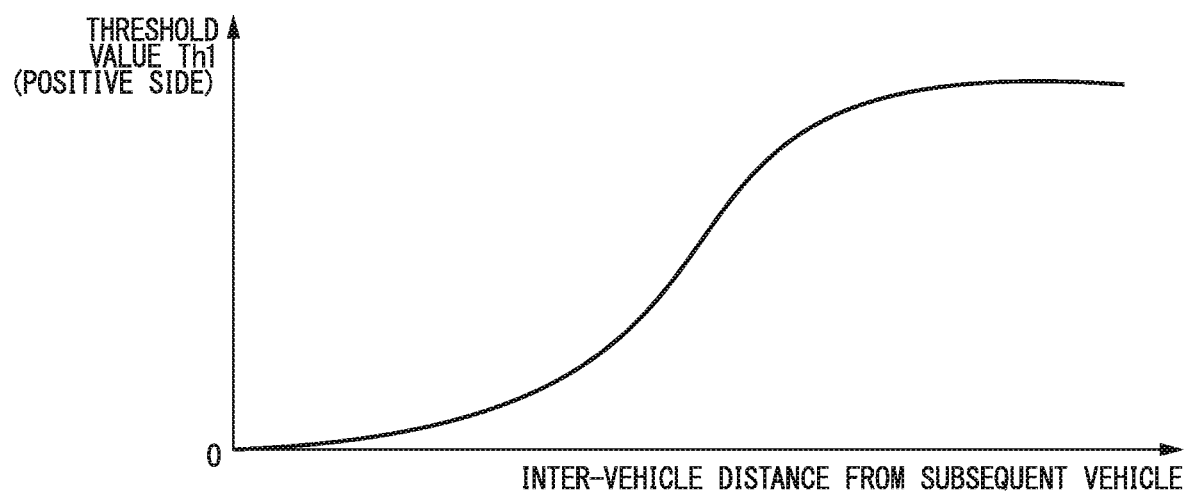
FIG. 24 is a figure illustrating a method of changing a size of an area of a dead zone.
Figure 25:
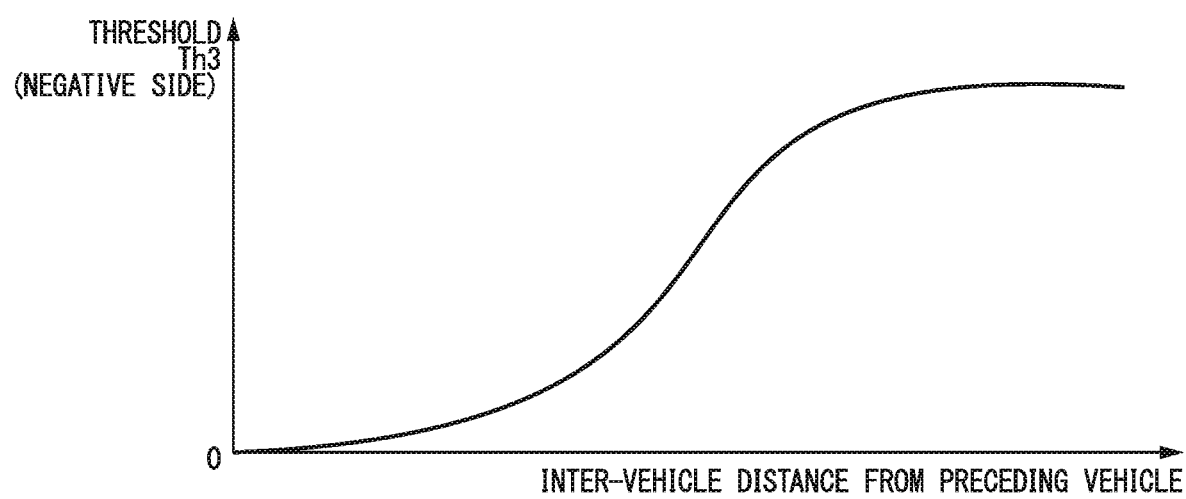
FIG. 25 is a figure illustrating a method of changing the size of the area of the dead zone.

FIGS. 24 and 25 are figures illustrating a method of changing the area size of the dead zone DZ.

As illustrated in FIG. 24, when the trajectory point K(i) is in front of the host vehicle position $P_{act}(i)$, the proportional integral gain adjustment part 180 or the proportional gain adjustment part 181 increases a threshold value Th1 on the positive side of the dead zone DZ, which are set by each of the proportional integral gain adjustment part 180 and the proportional gain adjustment part 181, as the inter-vehicle distance between the host vehicle M and the subsequent vehicle increases, and decreases the threshold value Th1 on the positive side as the inter-vehicle distance between the host vehicle M and the subsequent vehicle decreases. Accordingly, when the inter-vehicle distance between the host vehicle M and the subsequent vehicle is small, the acceleration and deceleration controller 164 can cause the acceleration to be frequently performed by narrowing the dead zone DZ in consideration of safety. In addition, when the inter-vehicle distance between the host vehicle M and the subsequent vehicle is great, the acceleration and deceleration controller 164 can cause the frequency of the acceleration to be decreased by widening the dead zone DZ.

Further, as illustrated in FIG. 25, when the trajectory point K(i) is behind the host vehicle position $P_{act}(i)$, the proportional integral gain adjustment part 180 or the proportional gain adjustment part 181 increases a threshold value Th3 on the negative side of the dead zone DZ, which are set by each of the proportional integral gain adjustment part 180 and the proportional gain adjustment part 181, as the inter-vehicle distance between the host vehicle M and the preceding vehicle increases, and decreases the threshold value Th3 on the negative side as the inter-vehicle distance between the host vehicle M and the preceding vehicle decreases. Accordingly, when the inter-vehicle distance between the host vehicle M and the preceding vehicle is shortened, the acceleration and deceleration controller 164 can cause the deceleration to be frequently performed by narrowing the dead zone DZ in consideration of safety. In addition, when the inter-vehicle distance between the host vehicle M and the preceding vehicle is increased, the acceleration and deceleration controller 164 can cause the frequency of the deceleration to be decreased by widening the dead zone DZ.

Figure 26:
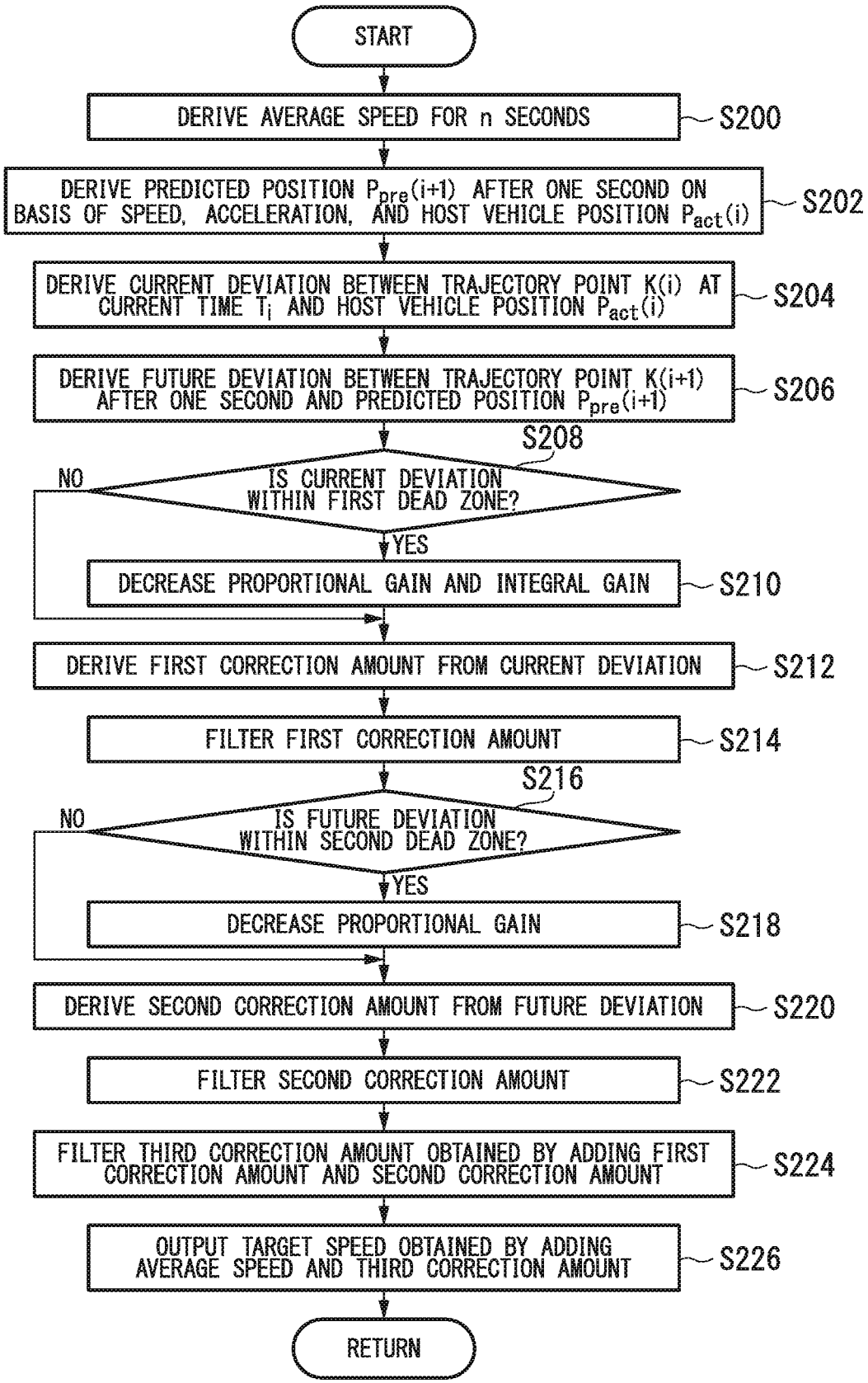
FIG. 26 is a flowchart showing an example of a flow of a process of the acceleration and deceleration controller in the second embodiment.

FIG. 26 is a flowchart showing an example of a flow of a process of the acceleration and deceleration controller 164A in the second embodiment. First, the first calculation part 165 extracts trajectory points K(i) to K(i+n) that the host vehicle M should reach until a time of n seconds elapses from a current time $t_i$ from among the plurality of trajectory points K included in the trajectory, and derives an average speed by dividing a length of the trajectory including these trajectory points K(i) to K(i+n) by the time of n seconds (step S200).

Then, on the basis of the vehicle position $P_{act}(i)$ recognized by the host vehicle position recognition part 140 and the speed v and the acceleration α of the host vehicle M detected by the vehicle sensor 60, the fourth calculation part 168 derives a predicted position $P_{pre}(i+1)$ that the host vehicle M is predicted to reach at a time $t_{i+1}$ after one second has elapsed from the current time $t_i$ (step S202).

Then, the subtractor 169 derives a current deviation obtained by subtracting the host vehicle position $P_{act}(i)$ from the trajectory point K(i) extracted by the second calculation part 166 (step S204). Then, the subtractor 170 derives a future deviation obtained by subtracting the predicted position $P_{pre}(i+1)$ derived by the fourth calculation part 168 from the trajectory point K(i+1) extracted by the third calculation part 167 (step S206).

Then, the proportional integral gain adjustment part 180 determines whether or not the current deviation is within the first dead zone DZ1 (step S208). When the current deviation is within the first dead zone DZ1, the proportional integral gain adjustment part 180 decreases one or both of the proportional gain and the integral gain in the proportional integral controller 171 (step S210). On the other hand, when the current deviation is not within the first dead zone DZ1, the proportional integral gain adjustment part 180 proceeds to a process of S212.

Then, the proportional integral controller 171 multiplies the current deviation output by the subtractor 169 by the predetermined proportional gain, multiplies the time integral value of the current deviation by the predetermined integral gain, and adds the resultant values to derive the first correction amount (step S212). Then, the first output adjustment part 173 performs filtering on the first correction amount (step S214).

Then, the proportional gain adjustment part 181 determines whether the future deviation is within the second dead zone DZ2 (step S216). When the future deviation is within the second dead zone DZ2, the proportional gain adjustment part 181 decreases the proportional gain in the proportional controller 172 (step S218). On the other hand, when the future deviation is not within the second dead zone DZ2, the proportional gain adjustment part 181 proceeds to a process of S220.

Then, the proportional controller 172 multiplies the future deviation output by the subtractor 170 by the predetermined proportional gain to derive the second correction amount (step S220). Then, the second output adjustment part 174 performs filtering on the second correction amount (step S222).

Then, the third output adjustment part 175 performs filtering on the third correction amount obtained by adding the first correction amount and the second correction amount (step S224). Then, the adder 177 adds the third correction amount adjusted by the third output adjustment part 175 to the average speed derived by the first calculation part 165 to output a resultant value as a target speed of the host vehicle M for n seconds from the current time $t_i$ (step S226). Accordingly, a process of this flowchart ends.

According to the second embodiment described above, since the dead zone DZ is set for any one or both of the future deviation and the current deviation, frequent occurrence of the acceleration and deceleration can be further suppressed. As a result, it is possible to reduce the discomfort of the occupant while taking the safety of the vehicle into consideration.

Further, according to the second embodiment, since the area of the dead zone DZ is changed on the basis of the inter-distance between the host vehicle and the preceding vehicle or the subsequent vehicle, it is possible to efficiently suppress the frequent occurrence of the acceleration and deceleration.

Third Embodiment

Hereinafter, a third embodiment will be described. The third embodiment is different from the first and third embodiments in that the output gain for the third correction amount is adjusted when the speed of the host vehicle M is low.

Hereinafter, such a difference will be mainly described.

Figure 27:
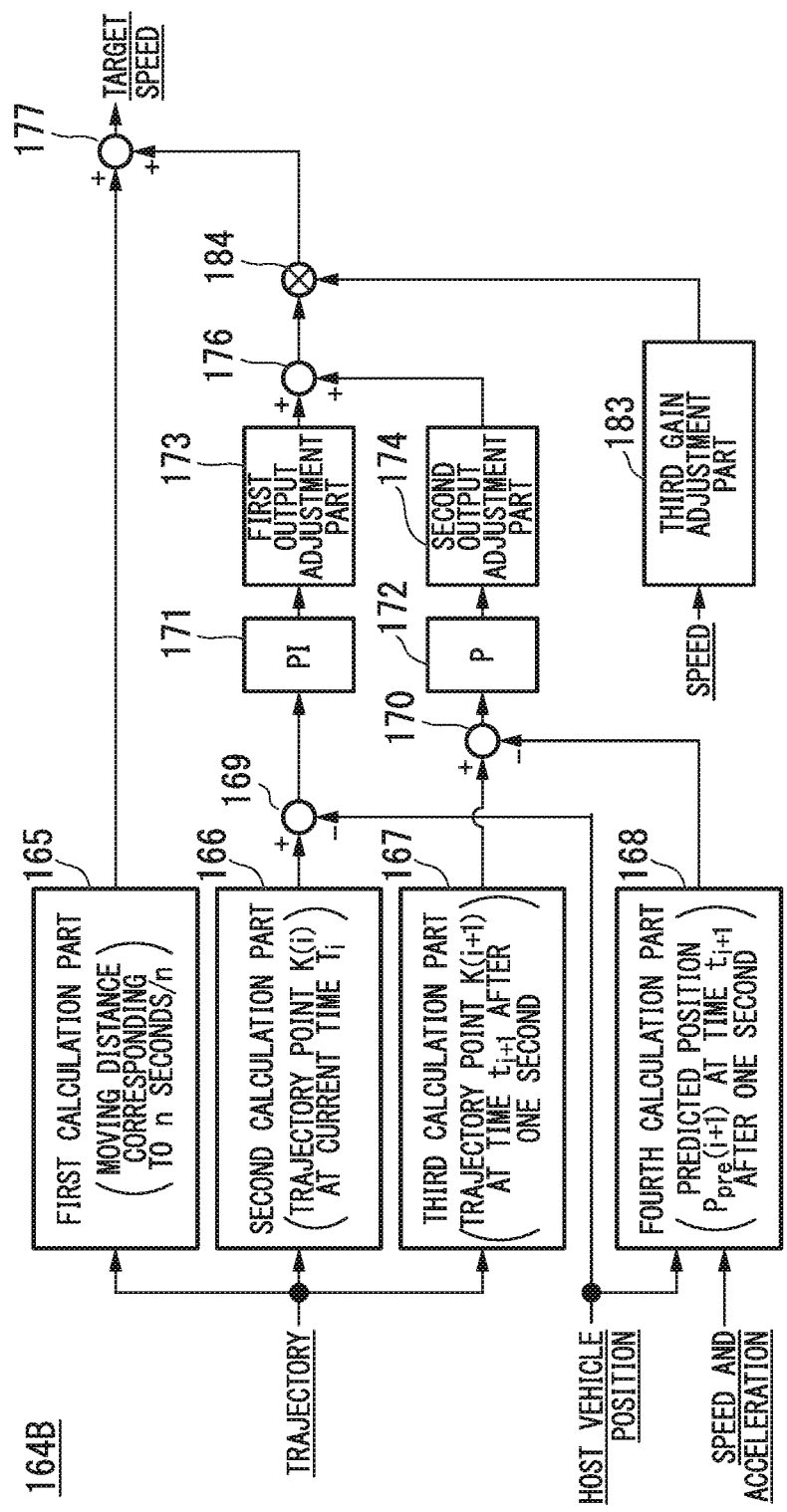
FIG. 27 is a figure illustrating an example of a configuration of an acceleration and deceleration controller in a third embodiment.

FIG. 27 is a figure illustrating an example of a configuration of the acceleration and deceleration controller 164B according to the third embodiment. The acceleration and deceleration controller 164B includes, for example, a first calculation part 165, a second calculation part 166, a third calculation part 167, a fourth calculation part 168, subtractors 169 and 170, a proportional integral controller 171, a proportional controller 172, a first output adjustment part 173, a second output adjustment part 174, adders 176 and 177, a third gain adjustment part 183, and a multiplier 184.

The third gain adjustment part 183 decreases an output gain for adjusting the third correction amount obtained by adding the first correction amount and the second correction amount as the speed v of the host vehicle M decreases.

The multiplier 184 multiplies the output gain adjusted by the third gain adjustment part 183 by the third correction amount output by the adder 176, and outputs a result value to the adder 177.

Figure 28:
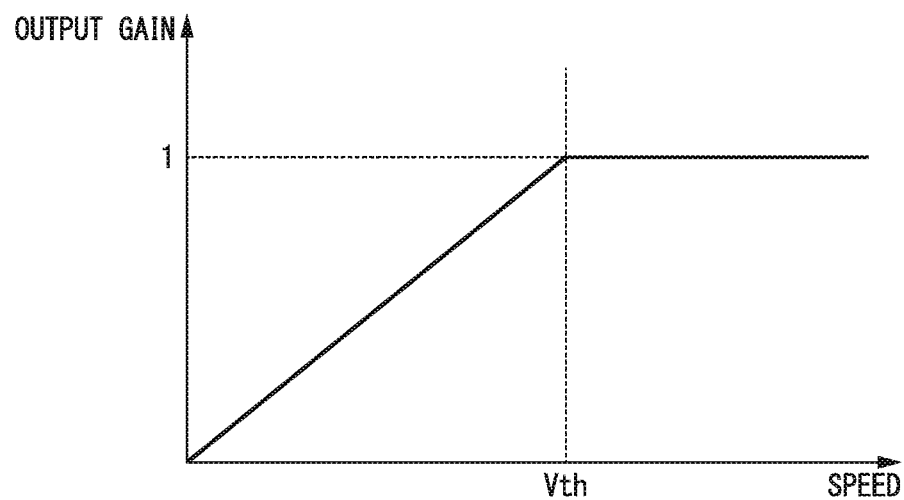
FIG. 28 is a figure illustrating an example of change in output gain with respect to a speed of a host vehicle.

FIG. 28 is a figure illustrating an example of change in the output gain with respect to the speed v of the host vehicle M. As illustrated in FIG. 28, when the speed v of the host vehicle M is equal to or lower than a speed threshold value Vth, the output gain decreases to 1 or smaller according to the decrease in the speed v. Therefore, when the host vehicle M gradually decelerates and stops, the third correction amount decreases, and therefore, the occurrence of acceleration and deceleration is further suppressed.

According to the third embodiment described above, since the third correction amount is decreased as the speed of the host vehicle M decreases, it is possible to suppress, for example, frequent occurrence of acceleration and deceleration when the host vehicle M stops.

Accordingly, it is possible to perform smooth stopping. Further, according to the third embodiment, since the third correction amount is increased as the speed of the host vehicle M increases, it is possible to smoothly accelerate the host vehicle M from a stopped state. As a result, it is possible to reduce discomfort of the occupant.

Although the modes for carrying out the present invention have been described above by way of embodiments, the present invention is not limited to the embodiments at all, and various modifications and substitutions may be made without departing from the scope of the present invention.

REFERENCE SIGNS LIST

20 Finder
30 Radar
40 Camera
DD Detection device
50 Navigation device
55 Communication device
60 Vehicle sensor
62 Display device
64 Speaker
70 Operation device
72 Operation detection Sensor
80 Changeover switch
100 Vehicle control system
110 Target lane determination part
120 Automated driving controller
130 Automated driving mode controller
140 Host vehicle position recognition part
142 Outside recognition part
144 Action plan generating part
146 Trajectory generating part
146A Travel aspect determination part
146B Trajectory candidate generation part
146C Evaluation and selection part
150 Switching controller
160 Travel controller
162 Steering controller
164 Acceleration and deceleration controller
165 First calculation part
166 Second calculation part
167 Third calculation part
168 Fourth calculation part
169, 170 Subtractor
171 Proportional integral controller
172 Proportional controller
173 First output adjustment part
174 Second output adjustment part
175 Third output adjustment part
176, 177 Adder
190 Storage
200 Driving force output device
210 Steering device
220 Brake device
M Host vehicle

What is claimed is:

1. A vehicle control system comprising:
a processor; and
a memory that stores instructions that, when executed by the processor, facilitates performance of operations, comprising:
recognizing a position of a vehicle;
generating a trajectory which includes a plurality of future target positions to be reached by the vehicle, the plurality of future target positions being consecutively aligned in time series;
a deriving a target speed when the vehicle is caused to travel along the trajectory based on a distance between the plurality of target positions included in the trajectory, deriving a first correction amount based on a first deviation between the position of the vehicle and a first target position corresponding to a recognition time at which the recognition of the position of the vehicle has been performed among the plurality of target positions;
extracting a second target position, which corresponds to a future time after a first predetermined time has elapsed from the recognition time, from among the plurality of target positions;
deriving, as the target speed, a speed obtained by dividing a length of the trajectory from the first target position to the second target position by the first predetermined time; and
correcting the target speed based on a second deviation between a third target position corresponding to a future time after a second predetermined time has elapsed from the recognition time and a predicted position that the vehicle is predicted to reach at the future time, the second predetermined time being shorter that the first predetermined time.

2. The vehicle control system according to claim 1,
wherein a limit is provided on one or both of a correction amount of the target speed based on the first deviation and a correction amount of the target speed based on the second deviation, and
wherein the operations further comprise correcting the target speed with a correction amount within a range of the limit.

3. The vehicle control system according to claim 1,
wherein an area in which a correction amount of the target speed is reduced according to the respective deviations is provided for at least one of the first deviation and the second deviation, and
when the first deviation is within a first area of the first deviation, the operations further comprise correcting the target speed with a correction amount that is smaller than the correction amount of the target speed when the first deviation is outside the first area, and
when the second deviation is within a second area of the second deviation, the operations further comprise correcting the derived target speed with a correction amount that is smaller than the correction amount of the target speed when the second deviation is outside the second area.

4. The vehicle control system according to claim 1,
wherein, when the first deviation is equal to or smaller than a first threshold value, the operations further comprise correcting the derived target speed with a correction amount which is smaller than a correction amount of the target speed when the first deviation exceeds the first threshold value, and
when the second deviation is equal to or smaller than a second threshold value, the operations further comprise correcting the derived target speed with a correction amount which is smaller than a correction amount of the target speed when the second deviation exceeds the second threshold value.

5. The vehicle control system according to claim 4, wherein the operations further comprise recognizing other vehicles traveling around the vehicle, and increasing one or both of the first threshold value and the second threshold value as an inter-vehicle distance between the vehicle and one or both of a preceding vehicle traveling in front of the vehicle and a subsequent vehicle traveling behind the vehicle, which are among the other vehicles, increases.

6. The vehicle control system according to claim 1, wherein the operations further comprise detecting a speed of the vehicle, and
decreasing a correction amount of the target speed based on the first deviation or the correction amount of the target speed based on the second deviation as the speed decreases.

7. A vehicle control method comprising:
recognizing, by an in-vehicle computer, a position of a vehicle;
generating, by the in-vehicle computer, a trajectory which includes a plurality of future target positions to be reached by the vehicle, the plurality of future target positions being consecutively aligned in time series;
deriving, by the in-vehicle computer, a target speed when the vehicle is caused to travel along the trajectory based on a distance between the plurality of target positions included in the trajectory;
deriving, by the in-vehicle computer, a first correction amount based on a first deviation between the recognized position of the vehicle and a first target position corresponding to a recognition time at which the recognition of the position of the vehicle has been performed among the plurality of target positions;
extracting, by the in-vehicle computer, a second target position, which corresponds to a future time after a first predetermined time has elapsed from the recognition time;
deriving, by the in-vehicle computer, a speed obtained by dividing a length of the trajectory from the first target position to the second target position by the first predetermined time; and
correcting, by the in-vehicle computer, the target speed based on a second deviation between a third target position corresponding to a future time after a second predetermined time has elapsed from the recognition time and a predicted position that the vehicle is predicted to reach at the future time, the second predetermined time being shorter that the first predetermined time.

8. A non-transitory computer-readable medium comprising a vehicle control program that causes an in-vehicle computer to:
recognize a position of a vehicle;
generate a trajectory which includes a plurality of future target positions to be reached by the vehicle, the plurality of future target positions being consecutively aligned in time series;
derive a target speed when the vehicle is caused to travel along the trajectory based on a distance between the plurality of target positions included in the trajectory;
derive a first correction amount based on a first deviation between the recognized position of the vehicle and a first target position corresponding to a recognition time at which the recognition of the position of the vehicle has been performed among the plurality of target positions;
extract a second target position, which corresponds to a future time after a first predetermined time has elapsed from the recognition time, from among the plurality of target positions;
derive, as the target speed, a speed obtained by dividing a length of the trajectory from the first target position to the second target position by the first predetermined time; and
correct the target speed based on a second deviation between a third target position corresponding to a future time after a second predetermined time has elapsed from the recognition time and a predicted position that the vehicle is predicted to reach at the future time, the second predetermined time being shorter that the first predetermined time.

9. A vehicle control system, comprising:
a processor configured to:
recognize a position of a vehicle;
generate a trajectory which includes a plurality of future target positions to be reached by the vehicle, the plurality of future target positions being consecutively aligned in time series;
derive a target speed when the vehicle is caused to travel along the trajectory based on a distance between the plurality of target positions included in the trajectory, and derive a first correction amount based on a first deviation between the position of the vehicle and a first target position corresponding to a recognition time at which the recognition of the position of the vehicle has been performed among the plurality of target positions,
extract a second target position, which corresponds to a future time after a first predetermined time has elapsed from the recognition time, from among the plurality of target positions,
derive, as the target speed, a speed obtained by dividing a length of the trajectory from the first target position to the second target position by the first predetermined time,
derive a third target position corresponding to a future time which is after a second predetermined time has elapsed from the recognition time, the second predetermined time being shorter than the first predetermined time,
derive a predicted position which is a position in which the vehicle is predicted to reach at the future time which is after the second predetermined time has elapsed from the position of the vehicle when the vehicle was recognized,
derive a second correction amount based on a second deviation between the third target position and the predicted position, and
correct the target speed by adding the first correction amount and the second correction amount to the target speed.

* * * * *